(12) United States Patent
Tegethoff

(10) Patent No.: US 10,386,806 B2
(45) Date of Patent: Aug. 20, 2019

(54) METHOD FOR CONNECTING MODELS OF TECHNICAL SYSTEMS IN A TESTING DEVICE EQUIPPED FOR CONTROL UNIT DEVELOPMENT

(71) Applicant: dSPACE digital signal processing and control engineering GmbH, Paderborn (DE)

(72) Inventor: Marc Tegethoff, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 665 days.

(21) Appl. No.: 14/842,152

(22) Filed: Sep. 1, 2015

(65) Prior Publication Data

US 2017/0060111 A1    Mar. 2, 2017

(51) Int. Cl.
*G05B 17/02*    (2006.01)

(52) U.S. Cl.
CPC .................................. *G05B 17/02* (2013.01)

(58) Field of Classification Search
CPC ........ G05B 17/00; G05B 17/02; G05B 15/00; G05B 13/04
USPC ........................................................ 702/123
See application file for complete search history.

(56) References Cited

U.S. PATENT DOCUMENTS

| | | |
|---|---|---|
| 7,050,923 B2 | 5/2006 | Fuller, III et al. |
| 7,134,090 B2 | 11/2006 | Kodosky et al. |
| 7,367,028 B2 | 4/2008 | Kodosky et al. |
| 7,478,337 B2 | 1/2009 | Kodosky et al. |
| 8,381,212 B2 | 2/2013 | Brelsford et al. |
| 2003/0171905 A1 | 9/2003 | Wagner et al. |
| 2004/0071094 A1 | 4/2004 | Holma et al. |

(Continued)

FOREIGN PATENT DOCUMENTS

| | | |
|---|---|---|
| CN | 1489306 A | 4/2004 |
| CN | 101197734 A | 6/2008 |

(Continued)

OTHER PUBLICATIONS

European Patent Office, "Search Report", dated Feb. 26, 2015.

(Continued)

*Primary Examiner* — Alexander Sofocleous
*Assistant Examiner* — Alfredo Bermudez Lozada
(74) *Attorney, Agent, or Firm* — Muncy, Geissler, Olds & Lowe, P.C.

(57) ABSTRACT

A method for connecting models of technical systems in a testing device equipped for control unit development having a connection of a first model of a first technical system to a second model of a second technical system. The first model and the second model include a model of a control unit, a model of a technical system to be controlled, or a model of an environment interacting with the control unit or with the technical system to be controlled. The first model has a first data interface and the second model has a second data interface. The method has the provision of a first model hierarchy structure and the provision of a second model hierarchy structure. The method has an automatic configuration of compatible connections so that the first model present in the testing device exchanges data with the second model present in the testing device through compatible connections.

15 Claims, 16 Drawing Sheets

(56) References Cited

U.S. PATENT DOCUMENTS

| | | |
|---|---|---|
| 2013/0055279 A1 | 2/2013 | Sistare |
| 2013/0086127 A1 | 4/2013 | Pogmore |
| 2014/0207994 A1 | 7/2014 | Cherkaoui et al. |
| 2015/0149944 A1* | 5/2015 | Franzen ................ G06F 3/0484 715/771 |

FOREIGN PATENT DOCUMENTS

| | | |
|---|---|---|
| CN | 103139822 A | 6/2013 |
| DE | 10 2013 100 603 B3 | 5/2014 |
| WO | WO 01/60023 A1 | 8/2001 |
| WO | WO 02065220 A1 | 8/2002 |

OTHER PUBLICATIONS

Chinese Office Action for Chinese Application No. 201510550016.4 dated Jul. 3, 2017 with English translation.
Chinese Office Action for Application No. 20151050016.4 dated Feb. 13, 2018.

* cited by examiner

METHOD FOR CONNECTING MODELS OF TECHNICAL SYSTEMS IN A TESTING DEVICE EQUIPPED FOR CONTROL UNIT DEVELOPMENT

BACKGROUND OF THE INVENTION

Field of the Invention

The present invention relates to the development of control units, such as are used in the automotive industry or in the aviation industry, for example, for controlling technical systems such as, e.g., engines or brakes. In particular, the present invention concerns testing devices that are used in the development process for the control unit.

Description of the Background Art

The development of control units has become a highly complex process. New control units and new control functions should thus be tested as early in the development process as possible in order to verify general functionality and to set the direction for further development. Towards the end of the development process, it is important to test the control unit, which has already undergone extensive development, as comprehensively as possible in order to make necessary modifications based on the test results before the control unit comes into use or enters mass production, so that it functions as desired under all conditions in later operation.

Three exemplary steps of the development process in which testing devices are used for testing the control unit are described below. So-called hardware-in-the-loop simulators (HIL simulators) are employed at a fairly late stage of the development process. Such HIL simulators contain a model of the technical system to be controlled, with the model being present in software. The HIL simulator may contain additional models as well, such as models of other systems that the technical system to be controlled interacts with. The HIL simulator also contains an input/output interface to which it is possible to connect the control unit, which has already undergone extensive development and is physically present as hardware. The functionality of the control unit can now be tested in various simulation passes, wherein it is possible to observe how the model of the technical system to be controlled reacts to the signals of the control unit, and how the control unit reacts to the events predefined by the model of the technical system to be controlled. In this process, it is possible to simulate not only normal operation, but also faults in the technical system to be controlled as well as faults in the control unit and faults in the communication between the control unit and the technical system to be controlled, such as, e.g., cable breaks or short circuits. Furthermore, it is also possible to observe the behavior of the technical system to be controlled together with the additional, interacting systems that are present as models in the HIL simulator.

In contrast, so-called rapid control prototyping (RCP) is a development step that takes place more toward the start of the development process. In RCP, the testing device is used in the role of the control unit. The testing device contains a model of the control unit to be tested. Because of the early stage of development, the model of the control unit to be tested is still fairly rudimentary in comparison to the later, final control unit. Nor is any hardware implementation of the control unit normally in existence yet; instead, the model of the control unit to be tested that is present in the testing device is a software model. Moreover, the testing device can contain additional models such as, e.g., models of technical systems that the control unit is later intended to interact with in addition to the system to be controlled. In this way, a broad environment of the control unit can be represented in the testing device. The testing device can be connected through an input/output interface to the technical system to be controlled itself, or to the control unit that exists to date for the technical system to be controlled. In the first case, there is a direct connection between the control unit to be tested, in the form of a software model, and the technical system to be controlled, which is physically present. In the second case, the control unit that exists to date is the technical system to be controlled by the RCP testing device. This control of the control unit that exists to date results in a modification of the control method of the control unit that exists to date, making it possible to test new control functionality via the externally connected RCP testing device. This arrangement is also referred to as bypassing.

In a still earlier phase of control unit development, the basic functionality of control and regulation methods can be evaluated in a purely computer-assisted manner. For this purpose, a model of the control unit can be connected to a model of the system to be controlled in order to test control functionality. The behavior of the model of the control unit can be observed and evaluated in interaction with the model of the later environment of the control unit. Once again, in addition to the model of the control unit and the model of the technical system to be controlled, there may be other models that represent additional elements of the environment of the control unit or of the technical system to be controlled, and that can be connected to the models of the control unit and of the technical system to be controlled for the simulation.

In the three phases of control unit development described, it is necessary, or it can be necessary or desirable, to connect models of different technical systems to one another in the testing device. Since one and the same testing device can be used for different simulations, the testing device is usually configured in a dedicated manner for each simulation or for each series of simulations. Accordingly, it is customary to produce particular connections between the models of different technical systems in the testing device prior to carrying out a particular simulation.

Nevertheless, there is as yet no satisfactory method that permits the connection of the models of technical systems in the testing device with acceptable effort while providing satisfactory adaptation to the individual case.

SUMMARY OF THE INVENTION

It is therefore an object of the present invention to provide an improved method for connecting models of technical systems in a testing device equipped for control unit development.

Exemplary embodiments of the invention comprise a method for connecting models of technical systems in a testing device equipped for control unit development, having a connection of a first model of a first technical system to a second model of a second technical system, wherein the first model and the second model are each one of the following: a model of a control unit, a model of a technical system to be controlled, or a model of an environment interacting with the control unit or with the technical system to be controlled, and wherein the first model has a first data interface and the second model has a second data interface. The method can include the following steps: (a) Provision of a first model hierarchy structure, which is a representation of at least a part of the first model, has a representation of at least a part of the first data interface, has a plurality of hierarchy levels, and is constructed from a first set of hierarchy elements; (b) Provision of a second model hierarchy structure, which is a representation of at least a part of the second model, has a representation of at least a part of the second data interface, has a plurality of hierarchy levels, and is constructed from a second set of hierarchy elements; (c) Allowing a selection of at least one arbitrary source hierarchy element from an arbitrary source hierarchy structure, wherein the source hierarchy structure is either the first model hierarchy structure or the second model hierarchy structure, and via which the other of the first model hierarchy structure and the second model hierarchy structure is defined as the destination hierarchy structure; (d) Isolation of a source sub-hierarchy structure based on the selection of the at least one source hierarchy element, wherein the source sub-hierarchy structure comprises the at least one source hierarchy element and the hierarchy elements located below the at least one source hierarchy element; (e) Allowing a selection of at least one destination hierarchy element from the destination hierarchy structure, wherein the selection of the at least one destination hierarchy element is not limited to a hierarchy level of the destination hierarchy structure that corresponds to the hierarchy level of the at least one source hierarchy element; (f) Isolation of a destination sub-hierarchy structure based on the selection of the at least one destination hierarchy element, wherein the destination sub-hierarchy structure comprises the at least one destination hierarchy element and the hierarchy elements located below the at least one destination hierarchy element; (g) Determination of compatible connections between hierarchy elements of the source sub-hierarchy structure and hierarchy elements of the destination sub-hierarchy structure, in particular determination of compatible connections between the hierarchy elements of the lowest hierarchy level of the source sub-hierarchy structure and the hierarchy elements of the lowest hierarchy level of the destination sub-hierarchy structure; and/or (h) automatic configuration of at least a part of the compatible connections so that the first model present in the testing device can exchange data, through at least the part of the compatible connections, with the second model present in the testing device.

The method according to the invention represents an optimized compromise between the automatic creation of compatible connections on the one hand, and the option of preselecting sub-hierarchy structures for limiting the automatic creation on the other hand. The method allows the selection of an arbitrary first hierarchy element or the selection of a plurality of arbitrary first hierarchy elements, either on the side of the first model of the first technical system or on the side of the second model of the second technical system. This selected hierarchy element or these selected hierarchy elements are called source hierarchy element(s). In this way, a part of the model hierarchy structure, i.e. a sub-hierarchy structure, is selected in one of the two model hierarchy structures, defining a first part of the selection set of hierarchy elements available for the connections that are to be created. This sub-hierarchy structure is referred to herein as the source sub-hierarchy structure. The method additionally allows the selection of a second hierarchy element or the selection of a plurality of second hierarchy elements from the other model hierarchy structure, which is to say from the first model hierarchy structure or from the second model hierarchy structure (depending on the choice of the at least one source hierarchy element), thus defining a second sub-hierarchy structure. The hierarchy element(s) selected in the other model hierarchy structure is/are referred to herein as destination hierarchy element(s). The second sub-hierarchy structure is referred to herein as the destination sub-hierarchy structure. This, in turn, defines the second part of the selection set of hierarchy elements available for the connections that are to be created.

Very flexible selection of sub-hierarchy structures is possible because the hierarchy level of the at least one source hierarchy element does not restrict or influence the selection of the at least one destination hierarchy element. In other words, neither a matching hierarchy level nor a matching number of hierarchy elements in the two sub-hierarchy structures is necessary, nor is there any other restriction with regard to the general structure of the sub-hierarchy structures for the selection of the at least one destination hierarchy element. In this way, a maximum degree of flexibility is made possible in the selection of the at least one source hierarchy element and the at least one destination hierarchy element.

This maximum degree of flexibility allows the user who creates the said connections in the testing device, regardless of whether it is a human user or a program, to make an assessment for each creation of compatible connections between the first model and the second model as to whether, for these particular connections, to prioritize the rapidity of the configuration process or the most accurate possible matching of the compatible connections to the present use case. For example, if the desire is for configuration of the compatible connections to take place especially rapidly, a large selection set of hierarchy elements can be specified by selecting hierarchy elements more from higher hierarchy levels, from which connections that tend to be more compatible can be automatically created in step (h). While this results in faster configuration, it is possible in this way to create compatible connections that are not perfectly matched to the present simulation case and that may not permit optimal simulation speed or accuracy. In contrast, by selecting the source and destination hierarchy elements more from lower hierarchy levels, it is possible to achieve better matching of the compatible connections to the present simulation case, and if applicable increased simulation speed and/or improved measurement accuracy. As a result of this degree of freedom with regard to the selectable hierarchy level, which can be used differently on the side of the first model hierarchy structure and on the side of the second model hierarchy structure, the user is able to place priority on exact desired compatible connections in some places on the basis of his knowledge of the simulation case at hand, while in other places accepting the possible disadvantages of the automatically created connections in exchange for the reduced configuration time. In this way, the user can undertake connection of the first model and the second model in an optimized manner with regard to the relative importance of configuration time and creation of specific compatible connections for a given simulation case.

This optimized compromise can be best illustrated with a look at other connection methods that either provide fully automatic connection of the complete hierarchy structures or individual connection of the hierarchy elements of the lowest hierarchy level. In the case of fully automatic connection of the first model hierarchy structure with the second model hierarchy structure, the user initiates the connection process once, whereupon a plurality of compatible connections are created according to a previously defined algorithm. Since normally there are multiple different possibilities for creating compatible connections between the first model hierarchy structure and the second model hierarchy structure, the result in this connection method depends substantially on the previously defined connection algorithm. The user has no influence on which specific connections are created, for example at the lowest hierarchy level.

In contrast, individual connection of the hierarchy elements of the lowest hierarchy level offers the user maximum flexibility and configuration freedom; he can determine each individual connection himself. This method for creating the connections is extremely time-consuming, however, because no automation of the creation of connections is provided at all. As compared to these two connection methods, the present invention allows an advantageous compromise between time duration of the configuration process and creation of the exact connections desired. Through the method according to the invention, the user can achieve the best compromise in the individual case with the aid of his specialized knowledge.

The optimized compromise has especially great impact in simulation scenarios in which a plurality of models in the testing device are connected to one another and are being tested simultaneously. Scenarios of this nature occur notably when additional aspects of the environment are included in the simulation beyond the control unit and the technical system to be controlled, which is to say when the environment of the control unit and of the system to be controlled is represented in a comprehensive manner for the simulation on the basis of additional models. In such cases, an especially large number of connections must be configured.

The term "testing device" can describe a unit that is physically present, which is to say a concrete testing device. The term testing device should not imply here that this unit has exactly one element. On the contrary, the testing device can be formed of multiple elements, such as, e.g., multiple computers that jointly make their computing capacity available and/or that divide the models between their memories. In order to operate as an HIL simulator or an RCP simulator, the testing device can have a physical input/output interface, such as, e.g., a terminal block for connecting various cables.

The first model of the first technical system and the second model of the second technical system are organized hierarchically. They can be represented in hierarchically structured form. Not only the particular data interfaces but also other aspects of the models can be represented in hierarchically structured form here. In abstract terms, one can visualize each the first model and the second model as a tree structure of different hierarchy elements on different hierarchy levels. The resultant model hierarchy structures are representations of at least parts of the first and the second models and at least parts of the first and the second data interfaces.

The first model and the second model can be: a model of a control unit, a model of a technical system to be controlled, or a model of an environment interacting with the control unit or with the technical system to be controlled. In other words, the first model is either a model of a control unit or a model of a system to be controlled or a model of an environment interacting with the control unit or a model of an environment interacting with the system to be controlled, and the second model is either a model of a control unit or a model of a system to be controlled or a model of an environment interacting with the control unit or a model of an environment interacting with the system to be controlled. All combinations for the first model and the second model are possible here. In other words, both the first model and the second model can be any of the four alternatives listed. The environment of the control unit and the environment of the system to be controlled can be any type of environment. In the automotive field, the environment may be the road network, for example. The model of the road network can be connected to the model of the engine and the model of the engine control unit, for example, in order to observe the behavior of the engine and engine control unit when traveling a particular route in the simulation. The model of the road network can be comparatively simple in this context, for instance can merely describe the roads with respect to their distances and speed limits. But it is also possible to provide more detailed information in an environment model of this nature, such as the nature of the road surface. This additional information can in turn be used to simulate feedback to the engine, possibly via additionally connected models of tires and chassis. It is evident that there can be many models of technical systems, in particular technical environment models, which can be incorporated in a simulation of a control unit and technical system to be controlled. In the simulation of a specific control unit and an associated technical system to be controlled, it is also possible to incorporate the models of additional control units or systems to be controlled that interact with the specific control unit and/or the associated technical system to be controlled. In the interconnected environment of a modern motor vehicle, there are a variety of interactions that can be simulated through the connections of the corresponding models.

The combination of allowing the selection of at least one arbitrary source hierarchy element in step (c) and the isolation of the source sub-hierarchy structure based on the selection of the at least one source hierarchy element in step (d) implies that the method according to the invention also has the receiving of the selection of the at least one source hierarchy element. In this context, let it be explicitly noted that the method can have, prior to step (d), the additional step of receiving the selection of the at least one source hierarchy element. In like manner, the method can have the step of receiving the selection of the at least one destination hierarchy element prior to step (f).

When more than one source hierarchy element is selected, the multiple source hierarchy elements are selected from the same model hierarchy structure. In other words, all source hierarchy elements come jointly from either the first model hierarchy structure or the second model hierarchy structure. The multiple source hierarchy elements may all be located on the same hierarchy level or on different hierarchy levels. Since the hierarchy level of the source hierarchy elements has no influence on the options in the selection of the at least one destination hierarchy element, it is irrelevant to the selection of the at least one destination hierarchy element whether the source hierarchy elements are located on the same hierarchy level or not. The same applies to allowing the selection of the destination hierarchy elements when more than one destination hierarchy element is selected. It is possible that the selection of exactly one source hierarchy element is allowed. Moreover, it is possible that the selection of exactly one destination hierarchy element is allowed.

The expression that the selection of the at least one destination hierarchy element is not limited to a hierarchy level of the destination hierarchy structure that corresponds to the hierarchy level of the at least one source hierarchy element provides that, in allowing the selection of the at least one destination hierarchy element from the destination hierarchy structure, selection is allowed from both the hierarchy level of the destination hierarchy structure that corresponds to the hierarchy level of the at least one source hierarchy element in the source hierarchy structure and from hierarchy levels other than the hierarchy level that corresponds to the hierarchy level of the at least one source hierarchy element in the source hierarchy structure. In this context, corresponding hierarchy levels are determined by counting the hierarchy levels either from the top to the bottom, or from the bottom to the top. In other words, in step (e) the selection of the at least one destination hierarchy element is allowed without any restrictions regarding specific hierarchy levels. It is possible that the selection of a destination hierarchy element from the destination hierarchy structure is allowed in step (e) when the destination hierarchy element is on a hierarchy level that does not correspond to the hierarchy level of the at least one source hierarchy element.

In the terminology of the present document, the lowest hierarchy level represents the smallest hierarchy unit. In the representation of a hierarchical tree structure, the lowest hierarchy level is composed, in the terminology of the present document, of the leaves, sometimes also referred to as "leafs".

The steps of isolation of a source sub-hierarchy structure and isolation of a destination sub-hierarchy structure can also lead to the isolation of the entire first model hierarchy structure or the entire second model hierarchy structure, or even to the isolation of a single hierarchy element of the lowest hierarchy level, depending on the choice of the at least one source hierarchy element and the at least one destination hierarchy element. For example, if the highest hierarchy element of the first model hierarchy structure is selected as the sole source hierarchy element, then the entire first model hierarchy structure is isolated. If, for example, a hierarchy element of the lowest hierarchy level of the first model hierarchy structure is selected as the sole source hierarchy element, then the source sub-hierarchy structure has only this one hierarchy element. If, for example, a hierarchy element of a middle hierarchy level is selected as the sole source hierarchy element, which is the most frequent case in most application scenarios, then the source sub-hierarchy structure has a part of the first or second model hierarchy structure. Similar applies with the destination hierarchy element and destination hierarchy structure. Steps (d) and (f) can accordingly also be expressed as isolation of a source/destination sub-hierarchy structure based on the selection of the at least one source/destination hierarchy element in each case, wherein the source/destination sub-hierarchy structure comprises the at least one source/destination hierarchy element and, if present, the hierarchy elements located below the at least one source/destination hierarchy element.

The determination of compatible connections between hierarchy elements of the source sub-hierarchy structure and hierarchy elements of the destination sub-hierarchy structure provides that a check is made as to whether a specific hierarchy element of the source sub-hierarchy structure, if applicable with the participation of the hierarchy elements located below it, can communicate with a hierarchy element of the destination sub-hierarchy structure, if applicable with the participation of the hierarchy elements located below it. In other words, a check is made as to whether an interface of the first model, defined by a hierarchy element on a specific hierarchy level, can communicate with, which is to say can exchange data with, an interface of the second model, likewise defined by a specific hierarchy element.

Each hierarchy element can have one or more properties. In other words, each hierarchy element has certain characteristics. To check the compatibility of hierarchy elements, the characteristics of the hierarchy elements of the first model can be compared with the characteristics of the hierarchy elements of the second model and checked for compatibility. The hierarchy elements can have a multiplicity of different types of properties or characteristics, as is explained in detail below.

The determination of the compatible connections can, but does not necessarily have to, comprise a complete comparison of all hierarchy elements of the source sub-hierarchy structure with all hierarchy elements of the destination sub-hierarchy structure. It is also possible that only hierarchy elements of the same hierarchy levels are checked for compatibility. In a special case it is possible that only the compatibility of the hierarchy elements of the lowest hierarchy level of the source sub-hierarchy structure and of the hierarchy elements of the lowest hierarchy level of the destination sub-hierarchy structure is determined. At this lowest level, the characteristics of the hierarchy elements can be compared for compatibility especially simply, since it is neither possible nor necessary to take into account hierarchy elements located below them in any form.

The automatic configuration of at least a part of the compatible connections that have been determined ultimately allows communication between the models present in the testing device. The concept of configuration here can comprise merely the creation of a software-based connection between the representation of the first technical system and the representation of the second technical system. But it is also possible that the step of configuration defines additional characteristics of this connection, such as, e.g., the communication frequency. In any case, the step of configuring the compatible connection ensures that an association exists between the hierarchy elements of such a nature that the first model can communicate with the second model through the compatible connections during the simulation to be carried out after the configuration. In other words, the communication functionality between the models is configured. Expressed in yet another way, the testing device is configured with regard to the communications capacity between the models.

The possibility exists that a plurality of compatible connections are possible between the source and the destination sub-hierarchy structures, some of which are mutually exclusive, for example because they contain the same hierarchy elements. In such a case, in step (h) the method can select the compatible connections that are automatically configured either randomly or according to other decision criteria, such as by a ranking of the connections. In other words, step (h) can have the step of selecting one compatible connection from mutually exclusive compatible connections.

The step of automatic configuration can relate to compatible connections of any hierarchy level. In other words, the compatible connections created in step (h) can be on any hierarchy level. In particular, at least a part of the compatible connections between the hierarchy elements of the lowest hierarchy level of the source sub-hierarchy structure and the hierarchy elements of the lowest hierarchy level of the destination sub-hierarchy structure can be configured automatically in step (h).

Emphasis is placed on the fact that the identification of the method steps with the letters (a) to (h) does not imply an order. On the contrary, the steps of the method can be carried out in any desired order as long as steps that draw on the results of other steps are carried out after those steps. However, the order of the steps using the sequence of the letters (a) to (h) does represent a possible and also useful order for the steps.

Emphasis is additionally placed on the fact that the testing device can also be a combination of multiple devices. In particular, the testing device can be a distributed test environment. Multiple devices can be connected for this purpose and be referred to jointly as a testing device.

A model of the control unit present in the testing device can be a model of the control unit to be tested, which is to say a model of the control unit under development. It is also possible, however, that only models which do not represent control units are connected to one another in the testing device and that the control unit to be tested is connected from the outside to these interconnected models, such as is possible with, e.g., an HIL simulator. Furthermore, it is possible that even though one or more models of control units are present in the testing device, the control unit to be tested is connected from the outside.

According to an embodiment, the first model and the second model can each be a model of a control unit. In this way, the models of two control units can be connected in the manner described above. The mutual interaction of the two control units can then be observed in the subsequent simulation.

According to an embodiment, the first model and the second model can each be a model of a technical system to be controlled. In this way, the models of two technical systems to be controlled can be connected in the manner described above. The mutual interaction of the two technical systems to be controlled can then be observed in the subsequent simulation.

According to an embodiment, the first model is a model of a control unit and the second model is a model of a technical system to be controlled. In this way, the models of a control unit and a technical system to be controlled can be connected in the manner described above. The interaction of the control unit and the technical system to be controlled can then be observed in the subsequent simulation. This is helpful primarily in a very early development phase, when the model of the control unit is a model of the control unit under development and the model of the technical system to be controlled is a model of the technical system that is expected to be controlled later by the control unit under development.

It is also possible that a model of a control unit or a model of a technical system to be controlled can be connected to a model of an environment interacting with the control unit or to a model of an environment interacting with the technical system to be controlled. Furthermore, it is possible that two environment models are connected to one another.

According to an embodiment, in step (c) a user is allowed to select at least one arbitrary source hierarchy element from the source hierarchy structure, and/or in step (e) the user is allowed to select the at least one destination hierarchy element from the destination hierarchy structure. It is also possible that in step (c) and/or in step (e) the selection is made possible by a machine-assisted method, such as through a configuration program or configuration script, for example.

According to an embodiment, step (h) is characterized in that all compatible connections are automatically configured. In other words, after the determination of the possible compatible connections, a maximum possible number of compatible connections is configured. This has the advantage for the user of ensuring that the maximum possible number of compatible connections between the sub-hierarchy structures is configured through the selection of the at least one source hierarchy element in the source hierarchy structure and of the at least one destination hierarchy element in the destination hierarchy structure. The user need not concern himself with the lowest hierarchy level with regard to the source and destination sub-hierarchy structures if he does not consider it necessary for these connections. Yet he can nonetheless rely on the fact that the later simulation can access the connections needed for a specific subsidiary aspect of the simulation.

According to an embodiment, step (h) can have an automatic configuration of connections at a higher level, via which hierarchy elements of the source sub-hierarchy structure that are located above the lowest hierarchy level and compatible hierarchy elements of the destination sub-hierarchy structure that are located above the lowest hierarchy level are connected. In this way, a communications connection is created between the first and second models at a level located hierarchically above the lowest hierarchy level. In this way, the communication of individual function blocks that extend beyond the lowest level is configured jointly.

According to an embodiment, hierarchy elements that are located outside of the source sub-hierarchy structure above the at least one source hierarchy element, and/or hierarchy elements that are located outside of the destination sub-hierarchy structure above the at least one destination hierarchy element, are additionally taken into account for the automatic configuration of connections, in particular for the automatic configuration of connections at a higher level. In this way, the configuration of compatible connections extends upward beyond the source sub-hierarchy structure and the destination sub-hierarchy structure, by via which a more comprehensive configuration across multiple hierarchy levels can take place without significant added effort.

According to an embodiment, at least a portion of the hierarchy elements of the first model hierarchy structure and at least a portion of the hierarchy elements of the second model hierarchy structure are characterized by attributes, and the determination of compatible connections in step (g) takes place as a function of the compatibility of the attributes. Attributes are convenient for defining the characteristics of the hierarchy elements. Moreover, attributes are easily compared by machine, making it possible to check the compatibility of the individual hierarchy elements rapidly.

According to an embodiment, the attributes have purely model-based attributes such as, e.g., model type, signal-based/event-based indication, controller model/plant model indication, calculation rate, hierarchy element name. Purely model-based attributes are understood herein to be attributes that have no correspondence, or at least no direct correspondence, in the modeled technical system. The model type is understood to mean the file format or the compatibility of the model with other models based on the representation in software. The indication of whether a model is signal-based or event-based can be influenced by the technical system represented, but can also be determined purely by the architecture of the model. The indication of whether a model is a controller model or a plant model can likewise be influenced by the technical system represented, but can also be defined independently as part of the model architecture. The calculation rate of the model relates to the later execution of the simulation with the aid of the model. The names of the individual hierarchy elements are determined purely by the model architecture. All of these attributes can be used in any combination for the compatibility of connections. For example, the names of hierarchy elements can be an indicator of whether two hierarchy elements are compatible.

According to an embodiment, the attributes have attributes corresponding to the technical system such as, e.g., connection type, signal count, signal rate, data flow direction, connection status, data type, scaling. Such attributes directly characterize the properties of the technical system represented, and in particular the system's interfaces to other technical systems. As a result, such attributes are useful for configuring connections that would be realistic within the framework of the technical systems represented in their implementation as hardware. It is additionally possible to determine the compatibility of hierarchy elements based on any desired combinations of purely model-based attributes and attributes corresponding to the technical system.

According to an embodiment, the compatible connections include a plurality of connections of like kind, wherein connections of like kind exist between hierarchy elements of the lowest hierarchy level of the first model hierarchy structure and the second model hierarchy structure with the same attributes in each case, wherein the combination of the connections of like kind forms a compatible group connection. In other words, connections of like kind are present when multiple hierarchy elements with identical attributes in the first model hierarchy structure are connected with multiple hierarchy elements with identical attributes in the second model hierarchy structure. The totality of these connections of like kind represents a compatible group connection. In this way, signals of like kind can be exchanged between the models in parallel as needed.

According to another embodiment, in the event that it is established in step (g) that, within either the source sub-hierarchy structure or the destination sub-hierarchy structure, there are more hierarchy elements of the lowest hierarchy level than compatible hierarchy elements in the other sub-hierarchy structure, then in step (h) the following step is additionally executed: (h') generation of additional hierarchy elements of the lowest hierarchy level on the side of the other sub-hierarchy structure, and automatic configuration of additional compatible connections using the additional hierarchy elements that are generated. Since the models are present in software, and accordingly are not static, but instead can be dynamically changed, the number of compatible connections can be increased by step (h'), via which as large a number as possible of the hierarchy elements in the sub-hierarchy structures is used and hence is available for the communication of the models. This feature should not be understood to mean that missing connections can always be dynamically created in this way. Instead, when a type of compatible connection is present of which there could be multiple such connections, then at least one additional instance of the compatible connection can be generated by generating additional hierarchy elements, for example.

According to an embodiment, step (e) allows the selection of at least one arbitrary destination hierarchy element from the destination hierarchy structure. In this case, the method thus allows not only the selection of at least one arbitrary source hierarchy element in the source hierarchy structure, but also the selection of at least one arbitrary destination hierarchy element in the destination hierarchy structure. In this way, it is made possible for the user to have the method test hierarchy elements for possible connections and configurations with complete freedom. In this case it is possible, however, that no connections are automatically configured in step (h), because in step (g) it was established that there are no compatible connections in the two sub-hierarchy structures defined by the selection.

According to an embodiment, the method can have the following step (k), which is executed prior to step (e). For each of the hierarchy elements of at least a part of the destination hierarchy structure, step (k) comprises an isolation of an applicable destination sub-hierarchy structure that comprises the applicable hierarchy element and hierarchy elements located below the applicable hierarchy element, and a check of whether at least one hierarchy element is present in the applicable destination sub-hierarchy structure for which a compatible connection to a hierarchy element of the source sub-hierarchy structure is possible. It is in turn possible that in step (k) the presence of possible compatible connections on the lowest hierarchy level and/or on higher hierarchy levels is checked. Due to the execution of step (k), in step (e) a selection is allowed of only those hierarchy elements for whose destination hierarchy structure a compatible connection was established in step (k). In this way, a preliminary selection is made by the method for the user as to which hierarchy elements on the side of the destination hierarchy structure can result in compatible connections in the first place. This in turn allows a more efficient connection process between the models. The fact that only certain hierarchy elements are available for selection can be indicated to the user visually, e.g., via colored markings, changes in the cursor, or the like, when he wishes to select the at least one destination hierarchy element on the screen.

According to an embodiment, at least the steps (c) to (h) are executed in multiple passes, wherein configured compatible connections from an earlier pass are no longer available for a later pass. It is possible in general that a hierarchy element can no longer be part of additional connections once this hierarchy element has been used up for a previously created connection. This may apply to all hierarchy elements, but may also apply to only a part of the hierarchy elements. It is possible, for example, that the hierarchy elements of the lowest hierarchy level are only available for one compatible connection apiece, while the hierarchy elements of higher levels can be part of one or more compatible connections. In this way, the user is allowed to configure the entire connection between the models in iterative steps, while preserving a clear association between hierarchy elements from the two hierarchy structures. In this way, it is ensured during the iterative configuration of the compatible connections that the resultant connections permit communication between the first model and the second model with consistent data.

According to an embodiment, at least the steps (c) to (h) are executed in multiple passes, wherein step (h) has the following steps at least once, depending on the selection of the at least one source hierarchy element and of the at least one destination hierarchy element: Deletion of at least one old, compatible connection configured in an earlier pass, and configuration of at least one new, compatible connection, wherein at least one hierarchy element of the old, compatible connection is used for a new, compatible connection. In this way, as well, it is ensured that there are only unique connections between hierarchy elements of the source hierarchy structure and hierarchy elements of the destination hierarchy structure. However, this feature allows the user to freely select hierarchy elements from the first model hierarchy structure and the second model hierarchy structure during iterative configuration of the connections, wherein the method gives priority to such a new selection over an old selection and replaces old connections with new ones if they are wanted as a result of the new selection. Once again, it is possible that the hierarchy elements may be part of only one compatible connection or that certain hierarchy elements may also be part of multiple compatible connections.

It is also possible that the method determines on the basis of a decision criterion whether, in the case of iterative performance of the method and in the case of an appropriate new selection that is in conflict with an existing, old, compatible connection, the old, compatible connections remain as described above, or are deleted and the hierarchy elements are released for new, compatible connections.

According to an embodiment, the testing device is a hardware-in-the-loop simulator. It is also possible that the testing device is a rapid control prototyping testing device. It is also possible that the testing device is a computer equipped with a simulation program.

According to an embodiment, steps (c) and (e) include the presentation of the first model hierarchy structure and the second model hierarchy structure on a graphical user interface of a computing device, such as a computer, a tablet, or a mobile telephone. In this way, it is made possible for the user to graphically select the at least one source hierarchy element and the at least one destination hierarchy element. A so-called drag-and-drop method can also be used to allow the user to select the at least one source hierarchy element and the at least one destination hierarchy element, in which it is made possible for the user to graphically drag an arbitrary selected source hierarchy element from the source hierarchy structure onto a destination hierarchy element in the destination hierarchy structure. This method is especially appropriate when the selection of exactly one source hierarchy element and exactly one destination hierarchy element is made possible in steps (c) and (e).

According to an embodiment, the method can have a connection of the first model and the second model to at least one additional model of another technical system, wherein each of the at least one additional models is one of the following: a model of a control unit, a model of a technical system to be controlled, or a model of an environment interacting with the control unit or with the technical system to be controlled. In this context, the method according to one of the above-described embodiments is carried out for each pair of the first model, the second model, and/or the at least one additional model. In this way, more than two models can be connected to one another, wherein the above-described method can be used for connecting each pair of models. Hence a plurality of models can be connected to one another very efficiently in a network.

Exemplary embodiments of the invention also comprise a method for modeling technical systems in a testing device equipped for control unit development, having a connection of a first model of a first technical system to a second model of a second technical system, wherein the first model and the second model are each one of the following: a model of a control unit, a model of a technical system to be controlled, or a model of an environment interacting with the control unit or with the technical system to be controlled, and wherein the first model has a first data interface and the second model has a second data interface. The method is carried out with the use of a reference model that has a reference data interface, wherein the reference data interface has a plurality of reference connection elements, and wherein the reference model has a plurality of internal connections between the reference connection elements. The method can include the following steps: (a) Provision of a first model hierarchy structure, which is a representation of at least a part of the first model, has a representation of at least a part of the first data interface, has a plurality of hierarchy levels, and is constructed from a first set of hierarchy elements; (b) Provision of a second model hierarchy structure, which is a representation of at least a part of the second model, has a representation of at least a part of the second data interface, has a plurality of hierarchy levels, and is constructed from a second set of hierarchy elements; (c) Allowing a selection of at least one arbitrary source hierarchy element from an arbitrary source hierarchy structure, wherein the source hierarchy structure is either the first model hierarchy structure or the second model hierarchy structure, and via which the other of the first model hierarchy structure and the second model hierarchy structure is defined as the destination hierarchy structure; (d) Isolation of a source sub-hierarchy structure based on the selection of the at least one source hierarchy element, wherein the source sub-hierarchy structure comprises the at least one source hierarchy element and the hierarchy elements located below the at least one source hierarchy element; (e) Determination of first compatible reference connections between hierarchy elements of the source sub-hierarchy structure and reference connection elements, in particular determination of first compatible reference connections between the hierarchy elements of the lowest hierarchy level of the source sub-hierarchy structure and reference connection elements; (f) Allowing a selection of at least one destination hierarchy element from the destination hierarchy structure, wherein the selection of the at least one destination hierarchy element is not limited to a hierarchy level of the destination hierarchy structure that corresponds to the hierarchy level of the at least one source hierarchy element; (g) Isolation of a destination sub-hierarchy structure based on the selection of the at least one destination hierarchy element, wherein the destination sub-hierarchy structure comprises the at least one destination hierarchy element and the hierarchy elements located below the at least one destination hierarchy element; (h) Determination of second compatible reference connections between hierarchy elements of the destination sub-hierarchy structure and reference connection elements, in particular determination of second compatible reference connections between the hierarchy elements of the lowest hierarchy level of the destination sub-hierarchy structure and reference connection elements; (i) Determination of compatible connections between hierarchy elements of the source sub-hierarchy structure and hierarchy elements of the destination sub-hierarchy structure, in particular determination of compatible connections between the hierarchy elements of the lowest hierarchy level of the source sub-hierarchy structure and the hierarchy elements of the lowest hierarchy level of the destination sub-hierarchy structure, on the basis of the first compatible reference connections, the internal connections of the reference model, and the second compatible reference connections; and (j) automatic configuration of at least a part of the compatible connections so that the first model present in the testing device can exchange data with the second model present in the testing device through at least the part of the compatible connections.

This method is an alternative to the above-described method with steps (a) to (h). While the above-described method connects two models directly to one another, in the alternative method the compatible connections to a reference model are determined. Via the chain having the first compatible reference connections between the first model and the reference model, the internal connections of the reference model, and the second compatible reference connections between the second model and the reference model, the compatible connections between the first model and the second model are determined through the indirect route of the reference model. While this alternative does take more steps, and consequently can be less efficient in some application scenarios, it is possible that this alternative provides more reusable intermediate results. When there are multiple passes of the method, compatible reference connections can be temporarily stored, so that it can be possible to determine the compatible connections for new combinations of source and destination hierarchy elements solely from the internal connections of the reference model. Emphasis is placed on the fact that all additional features, modifications, and effects described above for the method of direct connection of the first and second models can be applied in analogous fashion to the described alternative method of connection using a reference model.

Exemplary embodiments of the invention also comprise a method for control unit development with a testing device equipped for testing the control unit, having the following steps: performance of the method for connecting models of technical systems in a testing device equipped for control unit development, as described in one of the above embodiments, and performance of a simulation in which the first model present in the testing device communicates with the second model present in the testing device through the compatible connections that were automatically configured in step (h) or in step (j) of the method.

According to an embodiment, at least one of the first model and the second model communicates through an input/output interface of the testing device with a control unit to be tested that is connected to the testing device or with a technical system to be controlled that is connected to the testing device during the step of performance of the simulation.

Exemplary embodiments of the invention also comprise a computer program product and computer program for carrying out a method for connecting models of technical systems in a testing device equipped for control unit development that is designed such that a method according to one of the embodiments described above can be carried out.

Exemplary embodiments of the invention also comprise a testing device for control unit development, wherein the testing device has a first model of a first technical system and a second model of a second technical system, wherein the first model and the second model are each one of the following: a model of a control unit, a model of a technical system to be controlled, or a model of an environment interacting with the control unit or with the technical system to be controlled, wherein the testing device is equipped to carry out a method according to one of the above-described embodiments.

According to an embodiment, the testing device has an input/output interface for connecting a control unit to be tested or a technical system to be controlled, which interface allows communication of at least one of the first model and the second model with a control unit to be tested or with a technical system to be controlled.

Exemplary embodiments of the invention also comprise a combination of a testing device and an external computing device connected therewith, such as, e.g., a computer, tablet, or mobile telephone, wherein the testing device has a first model of a first technical system and a second model of a second technical system, wherein the first model and the second model are each one of the following: a model of a control unit, a model of a technical system to be controlled, or a model of an environment interacting with the control unit or with the technical system to be controlled, wherein the external computing device is equipped to carry out a method according to one of the above-described embodiments.

According to an embodiment, the testing device can have an input/output interface for connecting a control unit to be tested or a technical system to be controlled, which interface allows communication of at least one of the first model and the second model with a control unit to be tested or with a technical system to be controlled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
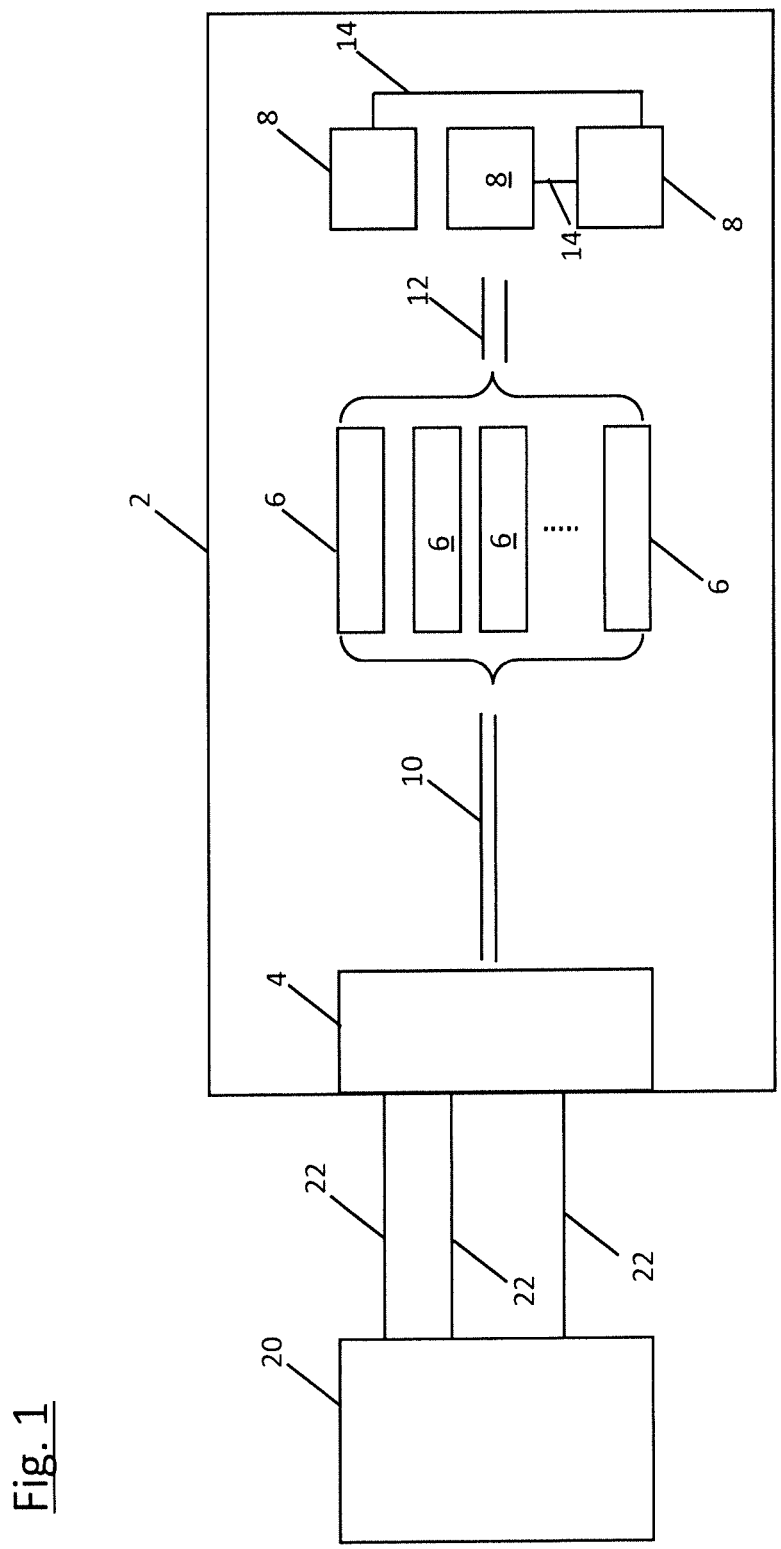
FIG. 1 shows a block diagram of an exemplary testing device that is connected to an exemplary control unit to be tested.

In FIG. 1, an exemplary testing device 2 according to one embodiment of the invention is shown in a block diagram. An embodiment of the method according to the invention for connecting models 8 of technical systems can be carried out on the testing device 2.

In the exemplary embodiment from FIG. 1, the testing device 2 has an input/output interface 4, a plurality of input/output functions 6, and three models 8 of technical systems. The input/output interface 4 and the input/output functions 6 of the testing device 2 are linked by connections 10. The input/output functions 6 and the models 8 are linked by connections 12. The models 8 are in part linked to one another through compatible connections 14. The creation of these compatible connections 14 is the subject matter of the method according to the invention, as is explained in detail below.

The exemplary testing device 2 has a plurality of input/output functions 6, only four of which are shown in FIG. 1 for the purposes of illustration. Furthermore, the testing device 2 can have any desired number of models 8 of technical systems. The number of models can be less than or greater than the three models 8 shown. The models 8 may all be connected to one another. It is also possible that only some of the models 8 are connected to one another so that they can communicate with one another. In FIG. 1, one model is connected to the other two models by way of example, while the other two models are not connected to one another.

In the exemplary embodiment from FIG. 1, one of the models 8 is a model of a technical system to be controlled, namely a model of a drive train of a motor vehicle. Another one of the models 8 is a model of a control unit for an automatic transmission. The model of the drive train of the motor vehicle and the model of the control unit for an automatic transmission are connected to one another. The connection of these models is explained in detail with reference to FIG. 2. In general, each model 8 can be a model of any desired technical system. The models can be models of technical systems that in operation are controlled by a control unit, or models of control units. It is also possible that one or more models are models of environments that interact with a technical system to be controlled or with a control unit. A model can also be a model of a technical system that is not directly controlled by the control unit, but that supplies data, such as sensor data, to the control unit and is therefore part of the control. Considered from the viewpoint of the technical system or of the control unit, environment models can also be input instances, such as, e.g., models of technical systems that make specifications for the engine, such as, e.g., a model of a cruise control assistant, or models of other input instances, such as, e.g., models of the behavior of a human driver. Even though the human driver is a human being, from the technical viewpoint of the control unit or of the technical system to be controlled he is an external input instance, which is to say a technical system. A model of a driver's behavior is thus a model of a technical system. The influence of the environment on the control, and vice versa, can also be observed in this way.

In the test setup from FIG. 1, the testing device 2 is connected to a control unit 20. The control unit 20 can be, e.g., a prototype of the control unit with which a technical system is to be controlled in operation after development is finished. As explained above, one of the models 8 is a model of the drive train of a motor vehicle. The control unit 20 is a control unit for fuel injection of the engine in the drive train and is connected to the model of the drive train for the simulation. In this regard, the control unit 20 can be tested for the fuel injection of the engine with the testing device 2. In order to provide the most realistic simulation conditions possible, in addition to being connected to the control unit 20, the model of the drive train is also connected to the model of the control unit for the automatic transmission. In this way, the interaction of the three components, drive train, control unit for the fuel injection, and control unit for the automatic transmission, can be tested. The connection of the models to one another is the subject matter of the present application and is explained in detail below.

The control unit 20 is connected to the testing device 2 by multiple cables 22. The cables 22 can have the same design as the cables that will be used in later operation to connect the control unit to the technical system to be controlled. However, they may also be cables designed specifically for the test. The cables 22 allow the exchange of signals between the testing device 2 and the control unit 20. It is also possible for multiple control units to be present that are connected to the testing device 2 at the same time. Multiple control units can be tested in parallel without influencing one another. It is also possible, however, that the influence of the control units on one another is exactly what is meant to be tested through the model of the technical system to be controlled.

The control unit 20 is implemented in hardware, which is to say the control unit 20 is a physical device that is connected to the physical testing device 2 by cables 22. Due to this design, the control unit can be tested as a hardware unit. This is the reason why the testing device 2 is a referred to as a hardware-in-the-loop simulator (HIL simulator). The control unit 20 can be subjected to a real-time simulation using the testing device 2. The fact that the control unit 20 is implemented in hardware does not say anything about the internal composition of the control unit 20. The control or regulation algorithm realized in the control unit 20 can also be implemented by a piece of software that runs on a processor.

The models 8 and the input/output functions 6 are a software model or software models and the software input/output functions associated therewith. The connections 12 and the compatible connections 14 are software connections as well. In contrast, the input/output interface 4 includes hardware resources that allow the cable 22 to be connected. The input/output functions 6 represent the input and output of the signals in the models 8 exchanged through the cables 22. In other words, the models 8 communicate with the control unit 20 through the input/output functions 6, through the connections 10, through the input/output interface 4, and through the cables 22.

The functionality of the control unit 20 can be tested or verified on the basis of this communication with multiple models 8. To this end, various simulations normally are carried out on the testing device 2 and the responses of the control unit are observed and evaluated. An evaluation is made as to whether the control unit is behaving as desired and how the models 8 are behaving together and as a result of the control by the control unit 20.

It is also possible that one of the models 8 is a model of a control unit to be tested and that a technical system to be controlled is connected to the testing device 2 by the cables 22. In this way a software implementation of a control unit can be tested, which is especially useful at an early point in the control unit development process. In this case, the testing device 2 is a rapid control prototyping (RCP) testing device. With RCP, the technical system to be controlled can be any technical system to be controlled, even an existing control unit that can be connected in turn to a technical system to be controlled and on which new or additional control functionality can be tested with the aid of the testing device 2.

It is also possible that the input/output interface 4 remains unused in the simulation or that the testing device 2 has no input/output interface. In this case, the interaction of two or more models 8 can be observed in a simulation.

Regardless of whether the testing device 2 is an HIL simulator or an RCP testing device or another type of testing device, compatible connections are created between the models 8 during configuration of the testing device 2 for a specific test.

In the block diagram from FIG. 1, the models 8 are represented as blocks. The models 8 each have a hierarchical structure, however. This hierarchical structure can have many different embodiments, and can be represented in many different ways.

Figure 2A:
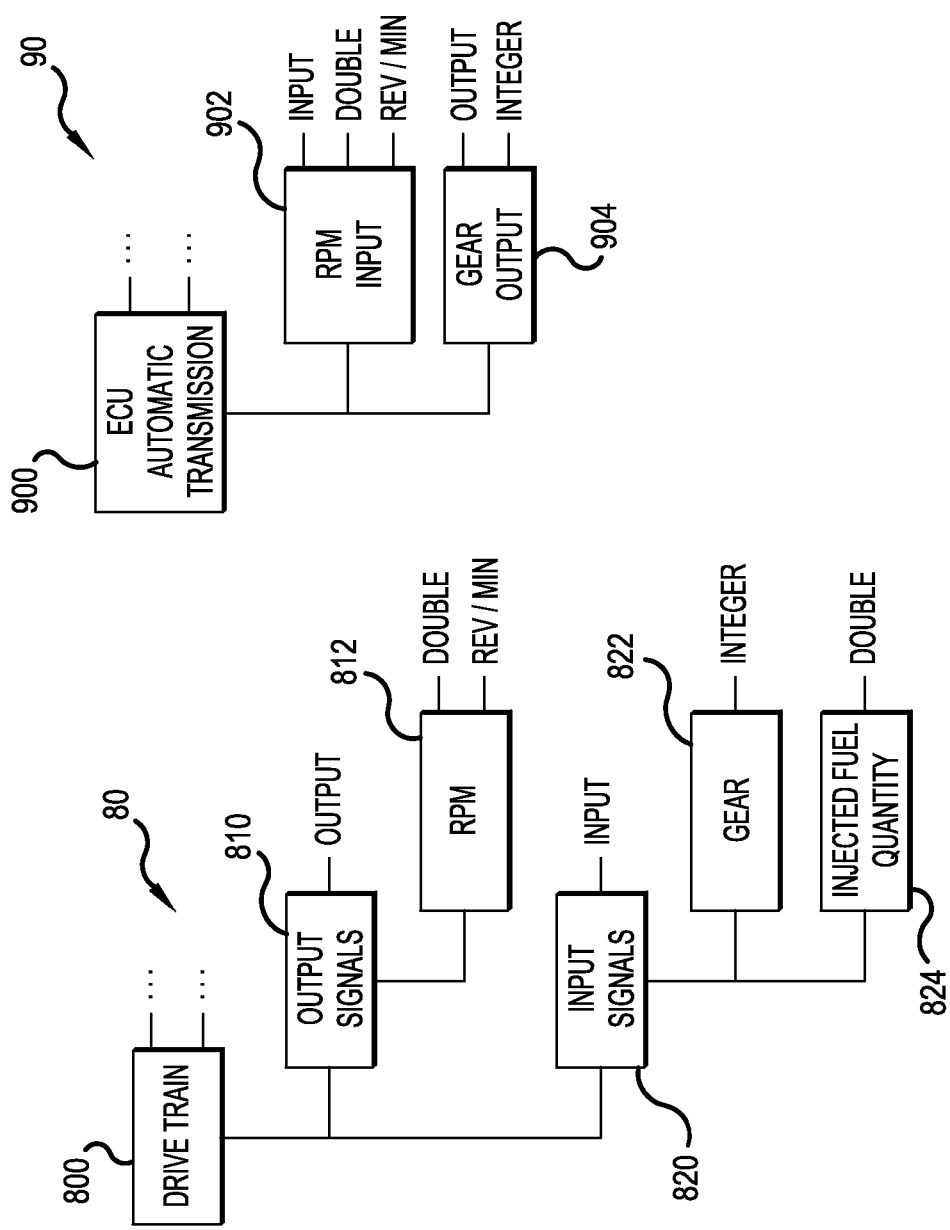
FIGS. 2a to 2b show exemplary model hierarchy structures for exemplary models in the exemplary testing device from FIG. 1.

FIG. 2a shows two exemplary model hierarchy structures 80 and 90 for two exemplary models, as can be present in the testing device from FIG. 1. The first model hierarchy structure 80 is a representation of the above-mentioned model of the drive train. The second model hierarchy structure 90 is a representation of the above-mentioned model of the control unit for an automatic transmission. Both the first model hierarchy structure 80 and the second model hierarchy structure 90 has multiple hierarchy elements. Emphasis is placed on the fact that the model hierarchy structures in FIG. 2a are greatly simplified for the purposes of better illustration. The model hierarchy structures can contain many times the number of hierarchy elements shown in FIG. 2a.

The first model hierarchy structure 80 is structured as follows. The first model hierarchy structure 80 has a hierarchy element 800 on the highest hierarchy level, also referred to as root node 800. As the root node, the hierarchy element 800 represents the totality of the model, and bears the name "drive train". The hierarchy element 800 has two attributes, namely an indication of the model type, which is to say an indication regarding the simulation environment necessary for processing of the model, and a calculation rate, which determines the time unit with which the model works during the simulation. On the hierarchy level located below that, the first model hierarchy structure 80 has two hierarchy elements 810 and 820, both of which depend on the root node 800. The hierarchy element 810 is called "output signals" and is a comprehensive hierarchy element for the totality of the output signals output by the model. The hierarchy element 820 is called "input signals" and is a comprehensive hierarchy element for the totality of the input signals received by the model. The hierarchy element 810 has one attribute, which indicates that it is an output interface. In analogous fashion, the hierarchy element 820 has one attribute, which indicates that it is an input interface. Together, the hierarchy elements 810 and 820 can be referred to as the interface hierarchy level. Dependent on the hierarchy element 810 is a hierarchy element 812, which is located on the third hierarchy level from the top. In the present example, this third hierarchy level is the lowest hierarchy level. The hierarchy element 812 is called "RPM". It has two attributes, namely a variable of the data type double, with which the current speed of the engine can be represented, and an indication with regard to the unit of the current speed, which shows rev/min as unit. Dependent on the hierarchy element 820 are two hierarchy elements 822 and 824. The hierarchy element 822 is called "gear". It has one attribute, namely a variable of the data type integer, with which the current gear of the transmission can be represented. The hierarchy element 824 is called "injected fuel quantity". It has one attribute, namely a variable of the data type double, with which the current desired quantity of injected fuel can be represented. Together, the hierarchy elements 812, 822, and 824 can be referred to as the signal hierarchy level.

The second model hierarchy structure 90 is structured as follows. The second model hierarchy structure 90 has a hierarchy element 900 on the highest hierarchy level, also referred to as root node 900. As the root node, the hierarchy element 900 represents the totality of the model and bears the name "control unit automatic transmission" or "ECU automatic transmission" ("Electronic Control Unit automatic transmission"). The hierarchy element 900 has two attributes, namely an indication of the model type, which is to say an indication regarding the simulation environment necessary for processing of the model, and a calculation rate, which determines the time unit with which the model works during the simulation. On the hierarchy level located below that, the second model hierarchy structure 90 has two hierarchy elements 902 and 904, both of which depend on the root node 900. The hierarchy element 902 is called "RPM input". It has three attributes, namely an indication that the hierarchy element is an input signal hierarchy element, a variable of the data type double, with which the current RPM of the engine to be controlled can be received, and an indication with regard to the unit of the current RPM, which shows rev/min as unit. The hierarchy element 904 is called "gear output". It has two attributes, namely an indication that the hierarchy element is an output signal hierarchy element, and a variable of the data type integer, with which the gear currently desired by the control unit can be indicated. Together, the hierarchy elements 902 and 904 can be referred to as the signal hierarchy level.

It is evident that the model hierarchy structures do not have to have the same number of hierarchy levels. It also is not a requirement for the attributes of the hierarchy elements to be assembled according to a uniform pattern. Between the root node and the interface hierarchy level, an additional hierarchy level can be inserted, which divides the model into submodels. In like manner, an additional hierarchy level can be inserted between the interface hierarchy level and the signal hierarchy level, which is composed of signal groups, for example. Generally speaking, any desired additional hierarchy levels can be present, with the structures of the models being hierarchical.

Both the first model and the second model are hierarchically organized and can be mapped to model hierarchy structures. This hierarchical organization can be represented graphically in a variety of ways, for instance through a structured block diagram or through a tree structure, as in FIG. 2a. For reasons of better clarity, exemplary implementations of the method are explained on the basis of two tree structures, where the two tree structures represent the first and second model hierarchy structures.

The creation of a compatible connection with the aid of an embodiment of the method according to the invention between the two models described with reference to FIG. 2a is presented using FIG. 2b. Accordingly, the first model hierarchy structure 80 and the second model hierarchy structure 90 from FIG. 2a are shown again in FIG. 2b.

In an exemplary pass of the method, hierarchy element 810 of the first model hierarchy structure 80 is selected as source hierarchy element. Accordingly, the first model hierarchy structure 80 is defined as source hierarchy structure, and the second model hierarchy structure 90 is defined as destination hierarchy structure. Based on the selection of the source hierarchy element 810, a source sub-hierarchy structure is isolated that includes the source hierarchy element 810 and the hierarchy element or elements located below it. Accordingly, the source sub-hierarchy structure has the hierarchy elements 810 and 812. In addition, the hierarchy element 900 is selected as destination hierarchy element in the exemplary pass of the method. Based on the selection of the destination hierarchy element 900, a destination sub-hierarchy structure is isolated that includes the destination hierarchy element 900 and the hierarchy element or elements located below it. Accordingly, the destination sub-hierarchy structure includes the hierarchy elements 900, 902, and 904. The selection of source hierarchy element 810 and destination hierarchy element 900 is illustrated in FIG. 2b by a dashed arrow.

The method determines compatible connections in the isolated sub-hierarchy structures. In particular, the method described here by way of example is designed such that it determines compatible connections between hierarchy elements of the lowest hierarchy level. In the present example, the method can determine whether the hierarchy element 812 is compatible with one of the hierarchy elements 902 and 904 in such a manner that signal exchange is possible. To this end, the attributes of the said hierarchy elements are compared while taking into account the attributes of the hierarchy elements above them. The following correspondences are present between the attributes of the hierarchy element 812 and the hierarchy element 902. Both hierarchy elements have as attribute a variable of the data type double and an indication that the value is a value with the unit rev/min. In addition, the hierarchy element 902 includes the indication that it is a signal input. This is compatible with the indication radiating from hierarchy element 810 to hierarchy element 812 that the hierarchy element 812 is a signal output. Moreover, the comparison of the names of the hierarchy elements 812 and 902, namely "RPM" and "RPM input", provides an indication that they could be compatible hierarchy elements. It is additionally assumed that the attributes of the hierarchy elements 800 and 900 are compatible, which is to say that the two models match in terms of their basic structure. Therefore, a compatible connection can be determined between the hierarchy elements 812 and 902, which is illustrated in FIG. 2b by an arrow. Despite the fact that the hierarchy elements 812 and 904 are also a signal input on the one side and a signal output on the other side, these elements are not compatible because of their other attributes (data type double as compared to integer, incompatible indications of unit).

The determination of compatibility can proceed in various ways. All the attributes just described may be used for the determination of compatibility. It is also possible, however, that only a subset thereof is used.

When the exemplary method is carried out multiple times with different source and destination hierarchy elements, the compatible connection between the hierarchy element 822 and the hierarchy element 904 can also be determined. The connections between the hierarchy elements 812 and 902, and between the hierarchy elements 822 and 904, are then configured, which is to say are set up such that the hierarchy elements can exchange data during the simulation to follow later. The interaction between the drive train and the control unit for the automatic transmission can be incorporated in the simulation.

The hierarchy element 824, which is to say the hierarchy element "injected fuel quantity", can be connected to the external control unit 20 for the fuel injection of the engine through the input/output functions 6 and through the input/output interface 4. As a result, the interaction of the three modules, drive train, control unit for the automatic transmission, and control unit for the fuel injection of the engine, can be tested, with the control unit for the fuel injection of the engine being present as a concrete implementation and the two other models being incorporated as software models.

Additional exemplary runs of exemplary embodiments of the method according to the invention are described on the basis of FIGS. 3 to 6.

FIG. 3 shows a first example of a first model hierarchy structure and a second model hierarchy structure during the course of an exemplary method according to the invention. Referring to FIG. 3, an example is illustrated of how a first model hierarchy structure and a second model hierarchy structure can be provided. The left-hand tree structure is a representation of a hierarchical first model. The root node of the first model hierarchy structure, labeled with reference number 800, constitutes the highest hierarchy level. Located one hierarchy level below the highest hierarchy level are two hierarchy elements 830 and 832, which are also referred to as nodes 830 and 832, and both of which are associated with the root node 800. In the terminology of hierarchy structures, one can also say that the root node contains the two nodes 830 and 832. In addition, the first model hierarchy structure contains four hierarchy elements of the lowest hierarchy level, namely the hierarchy elements 830.a, 830.b, 832.a, and 832.b. As hierarchy elements of the lowest hierarchy level, the hierarchy elements 830.a, 830.b, 832.a, and 832.b are also referred to as leaves of the tree structure, or sometimes so-called leafs. The leaves 830.a and 830.b are associated with the node 830, while the leaves 832.a and 832.b are associated with the node 832. The root node 800, the nodes 830 and 832, and the leaves 830.a, 830.b, 832.a, and 832.b are all hierarchy elements, and together constitute a representation of the first model.

The right-hand tree structure is a representation of a hierarchical second model. The root node of the second model hierarchy structure is labeled with reference number 900. Located one hierarchy level below the root node 900 are two nodes 920 and 922, both of which depend on the root node 900. The node 920, in turn, contains two subnodes 930 and 932. The root node 900, the two nodes 920 and 922, and the two subnodes 930 and 932 are all hierarchy elements, which together constitute the second model hierarchy structure.

Figure 3A:
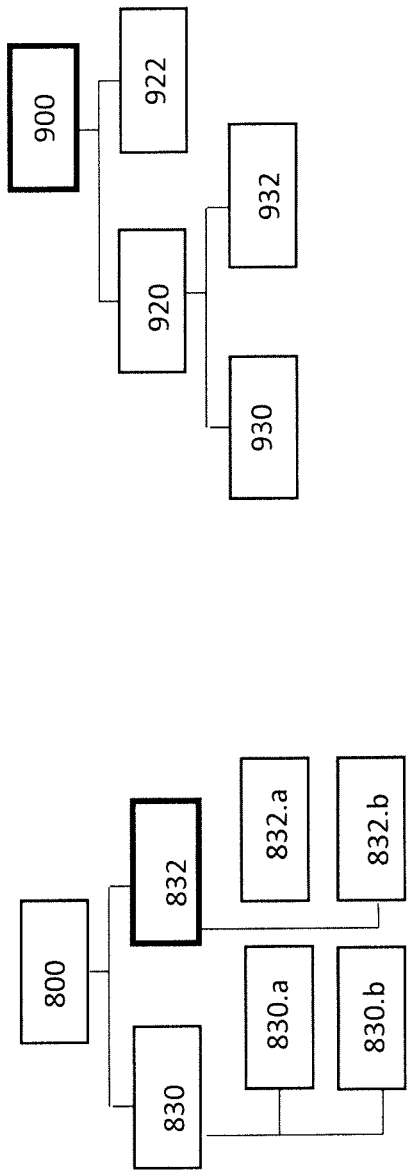
FIGS. 3a to 3b show an exemplary implementation of the method for connecting models of technical systems on the basis of the applicable model hierarchy structures.
Figure 3B:
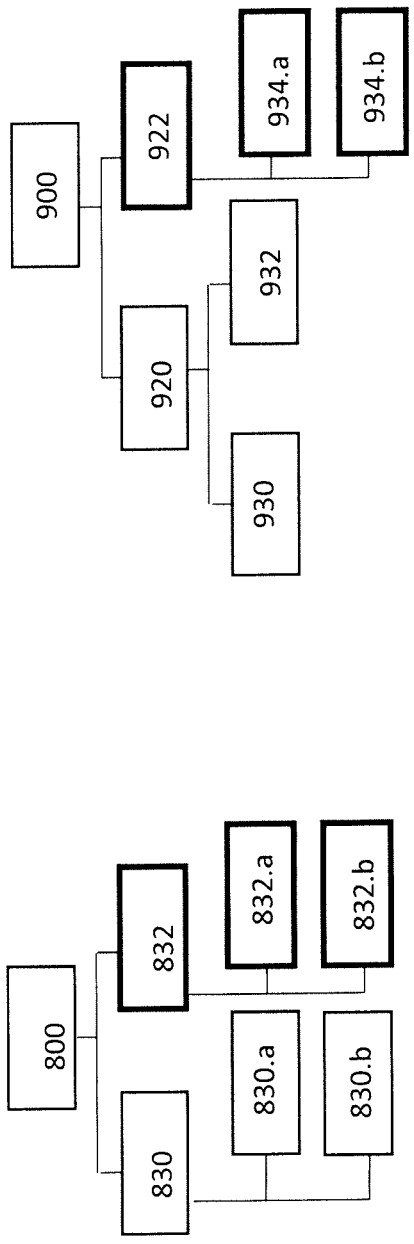

The two model hierarchy structures from FIG. 3a are shown as approximately equal in size, which is to say with a similar number of hierarchy elements. This is merely by way of example for better understanding. In many cases, the fact of the matter is that the model hierarchy structures are different in size. Moreover, it is oftentimes the case that the model hierarchy structures have many times the number of hierarchy elements shown.

The exemplary method according to the invention allows, after the provision of the two model hierarchy structures, the selection of an arbitrary first hierarchy element from the two hierarchy structures. For the exemplary method sequence, it is assumed that the choice, whether the selection is made by a human user or in an automated way by a configuration program, falls on the node 832. In other words, in the exemplary sequence, the method includes receiving the selection of the node 832. This selection of the node 832 is illustrated in FIG. 3a by the heavy outline. In this way, the node 832 is defined as a source hierarchy element. It is additionally defined via this selection that the first model hierarchy structure is the source hierarchy structure, which in turn implicitly defines that the second model hierarchy structure is the destination hierarchy structure. In like manner, due to the selection of the node 832, a source sub-hierarchy structure is defined that contains the node 832 and the leaves 832.a and 832.b, which is to say the source hierarchy element and all hierarchy elements in the first model hierarchy structure located below the source hierarchy element.

Explicit mention is made of the fact that the user or the configuration program is free to select the source hierarchy element from the second model hierarchy structure. In this case the second model hierarchy structure is then the source hierarchy structure, the first model hierarchy structure is the destination hierarchy structure, and the source sub-hierarchy structure is a part of the second model hierarchy structure. For the sake of easier understanding, it is assumed in FIGS. 3-6 that the source hierarchy element from the first model hierarchy structure is selected by the user or the configuration program and that the method thus defines the first model hierarchy structure as the source hierarchy structure. Again for ease of understanding, FIGS. 3-6 treat cases in which there is one source hierarchy element and one destination hierarchy element in each case. But it is expressly emphasized that multiple source hierarchy elements and/or multiple destination hierarchy elements can be selected.

After the selection of the node 832 as the source hierarchy element, the method allows the selection of a destination hierarchy element, which must come from the destination hierarchy structure, thus in the present case must come from the second model hierarchy structure. Apart from this condition, that the destination hierarchy element must come from the destination hierarchy structure, there are no restrictions of any sort regarding the selection of the destination hierarchy element. In particular, there are no restrictions regarding the hierarchy level of the destination hierarchy element. In the present example, it is assumed that the root node 900 is selected. The method receives the root node 900 as the selection of the destination hierarchy element. Owing to the selection of the destination hierarchy element, a destination sub-hierarchy structure is defined that comprises the destination hierarchy element and all hierarchy elements located below it. Since the destination hierarchy element is the root node 900 in the present example, the destination sub-hierarchy structure corresponds to the entire second model hierarchy structure. It is evident from this that the term sub-hierarchy structure provides that the sub-hierarchy structure can be a portion of the entire hierarchy structure, but can also be the entire hierarchy structure. The selection of the root node 900 is likewise illustrated by a heavy outline.

After isolation of the source sub-hierarchy structure and the destination sub-hierarchy structure, the method checks for what compatible connections are possible between the hierarchy elements of the source sub-hierarchy structure and the hierarchy elements of the destination sub-hierarchy structure. In doing so, the method compares the particular characteristics of the available hierarchy elements. In the present example, it is determined in the exemplary method that the node 832 and the node 922 are compatible. In addition, it is determined that the node 922 is configured such that leaves 934.*a* and 934.*b* dependent on it can be newly created. On the basis of this information concerning the compatibilities of the hierarchy elements, the method automatically configures a compatible connection between the node 832 and the node 922 as well as two additional compatible connections on the lowest hierarchy level, namely between the leaf 832.*a* and the leaf 934.*a*, and between the leaf 832.*b* and the leaf 934.*b*. The hierarchy elements connected to one another by these compatible connections are illustrated with a heavy outline in FIG. 3*b*. The compatible connections allow the first model to communicate with the second model in the testing device at the time of the simulation.

Another exemplary method sequence according to the invention is illustrated in FIG. 4. The first model hierarchy structure from FIG. 4 is similar to the first model hierarchy structure from FIG. 3. However, the node 830 has a quantity n of leaves, where n is greater than or equal to six. The second model hierarchy structure from FIG. 4 is more extensive than the second model hierarchy structure from FIG. 3. Each of the two subnodes 930 and 932 as well as the node 922 has two leaves apiece. The subnode 930 has the two leaves 930.*a* and 930.*b*, the subnode 932 has the two leaves 932.*a* and 932.*b*, and the node 922 has the two leaves 934.*a* and 934.*b*.

Figure 4A:
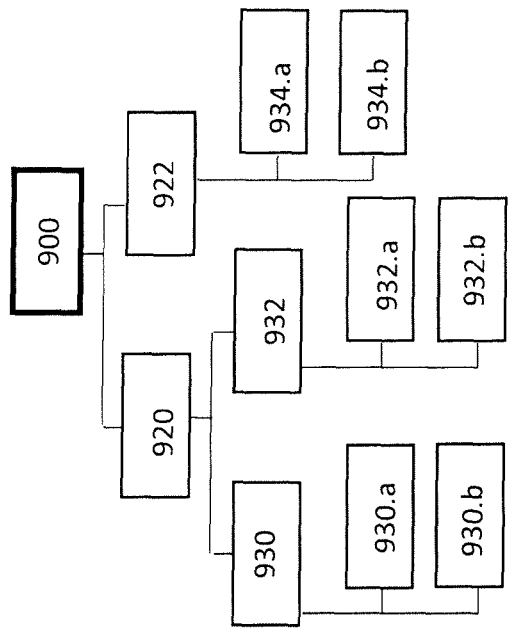
FIGS. 4a and 4b show an exemplary implementation of the method for connecting models of technical systems on the basis of the applicable model hierarchy structures.
Figure 4A:
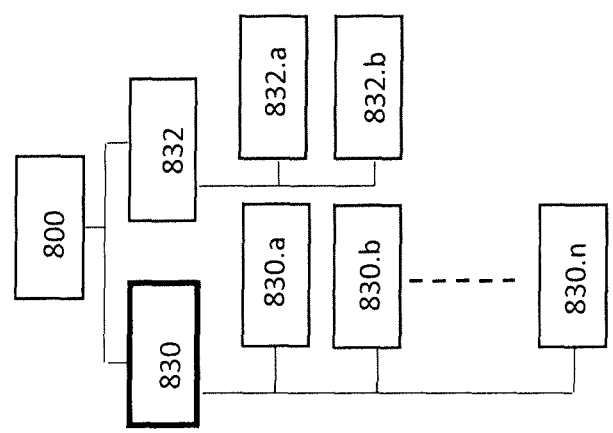

In the exemplary method sequence from FIG. 4, the node 830 is selected as source hierarchy element and the root node 900 is selected as destination hierarchy element, which again is illustrated by a heavy outline in FIG. 4*a*. Therefore, the source sub-hierarchy structure comprises the node 830 and the leaves 830.*a*, 830.*b*, . . . , 830.*n*. The destination sub-hierarchy structure again comprises the entire second model hierarchy structure.

Figure 4B:
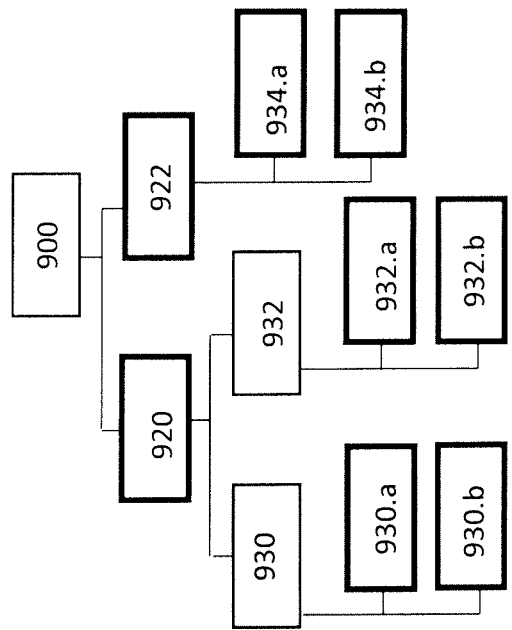
Figure 4B:
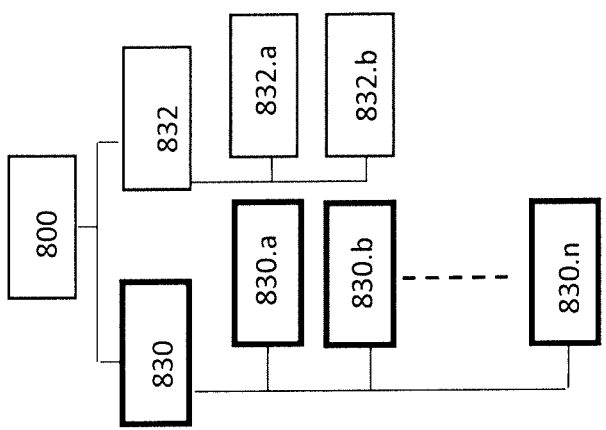

After the selection of the source hierarchy element 830 and of the destination hierarchy element 900, it is established that in the present exemplary case the leaves 830.*a*, 830.*b*, . . . , 830.*n* are compatible with all leaves of the destination hierarchy structure. Therefore, the compatible connections indicated by heavy outlines in FIG. 4*b* are automatically configured. In the process, the node 830 is connected to both the node 920 and to the node 922. Six more compatible connections are created on the lowest hierarchy level, to be specific between leaf 830.*a* and leaf 930.*a*, between leaf 830.*b* and leaf 930.*b*, between leaf 830.*c* (not shown) and leaf 932.*a*, between leaf 830.*d* (not shown) and leaf 932.*b*, between leaf 830.*e* (not shown) and leaf 934.*a*, and between leaf 830.*n* and leaf 934.*b*. It must be noted that it is possible in the present example for hierarchy elements that are not located on the lowest hierarchy levels to be part of multiple compatible connections, such as, e.g. node 830. In contrast, hierarchy elements on the lowest hierarchy level can each only be part of one compatible connection in the example described.

An iterative performance of an exemplary method according to the invention is illustrated in FIG. 5. The first model hierarchy structure from FIG. 5 corresponds to the first model hierarchy structure from FIG. 4 (cf. FIG. 5*a* and FIG. 4*a*). The second model hierarchy structure in FIG. 5 corresponds to the second model hierarchy structure in FIG. 3 with the exception that the subnode 930 has two leaves 930.*a* and 930.*b* (cf. FIG. 5*a* and FIG. 3*a*). The heavy outlines in FIG. 5*a* illustrate that the node 830 and the node 922 are selected as a source or destination hierarchy element, respectively, in an exemplary first pass of the method. The destination hierarchy structure thus has only the hierarchy element 622.

During determination of the compatible connections it is established from the attributes of the node 922 that exactly two hierarchy elements compatible to the leaves 830.*a* and 830.*b* can be made dependent on the node 922. As a result of this, a compatible connection between the node 830 and the node 922 and two compatible connections between the leaves 830.*a* and 934.*a* and between the leaves 830.*b* and 934.*b* are automatically configured. The compatible connections are illustrated by heavy outlines in FIG. 5*b*. This concludes the first pass of the method.

Figure 5A:
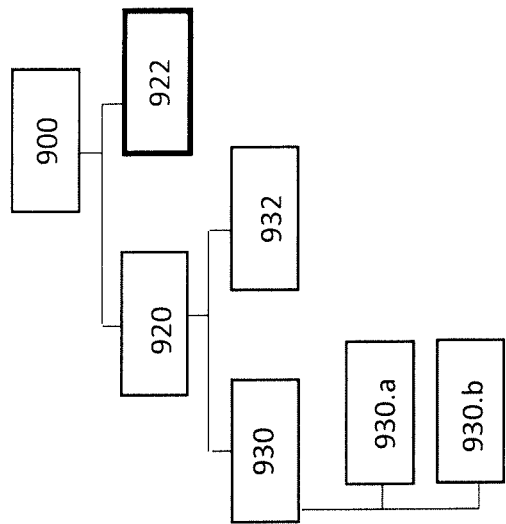
FIGS. 5a to 5d show an exemplary implementation of the method for connecting models of technical systems on the basis of the applicable model hierarchy structures.
Figure 5A:
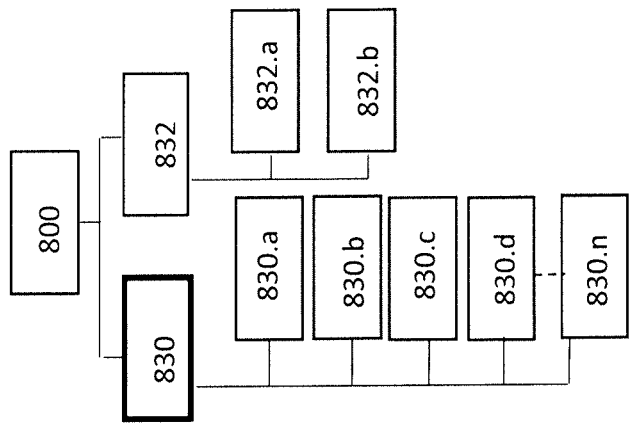
Figure 5B:
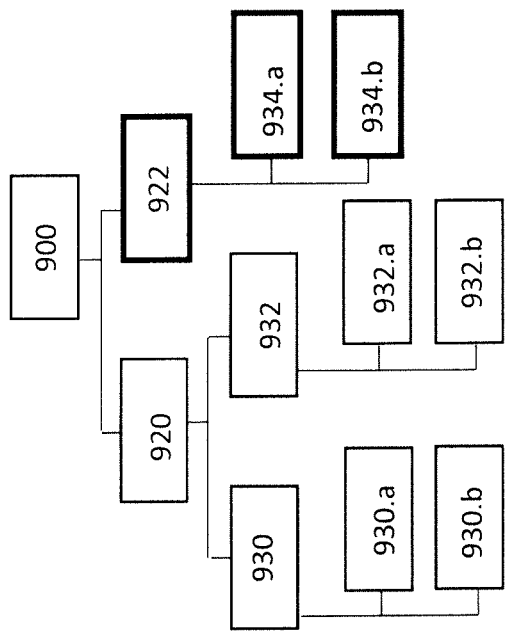
Figure 5B:
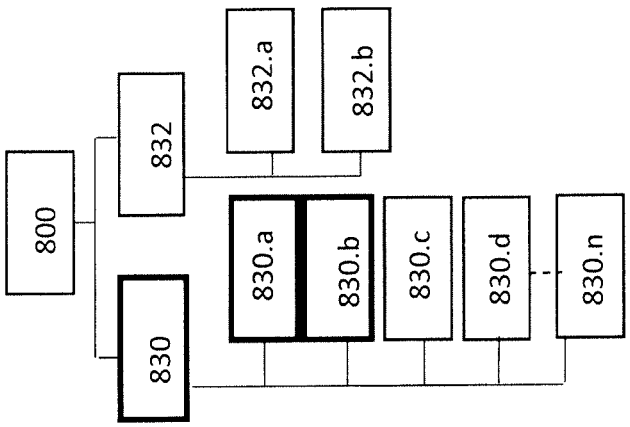
Figure 5C:
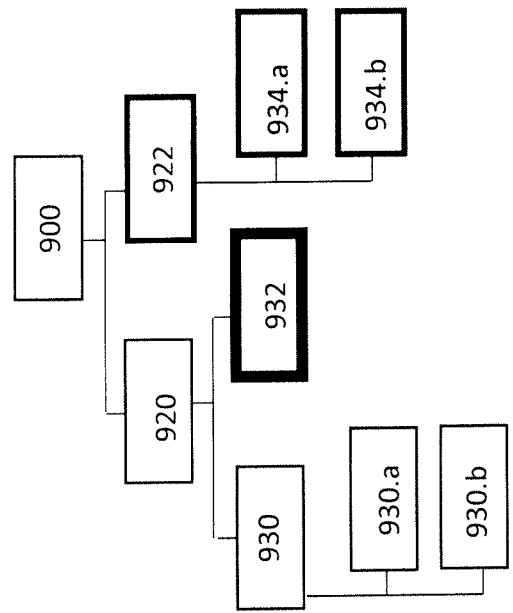
Figure 5C:
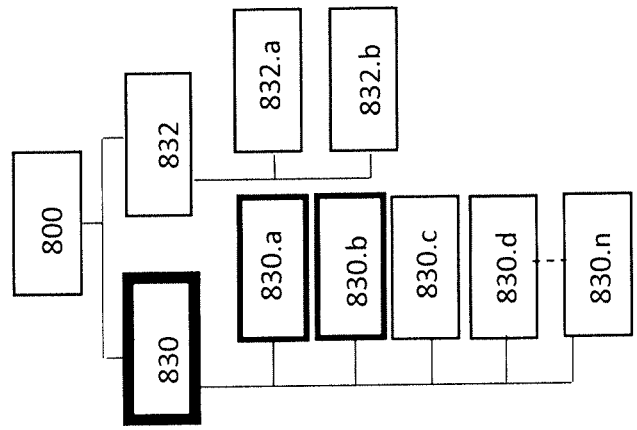
Figure 5D:
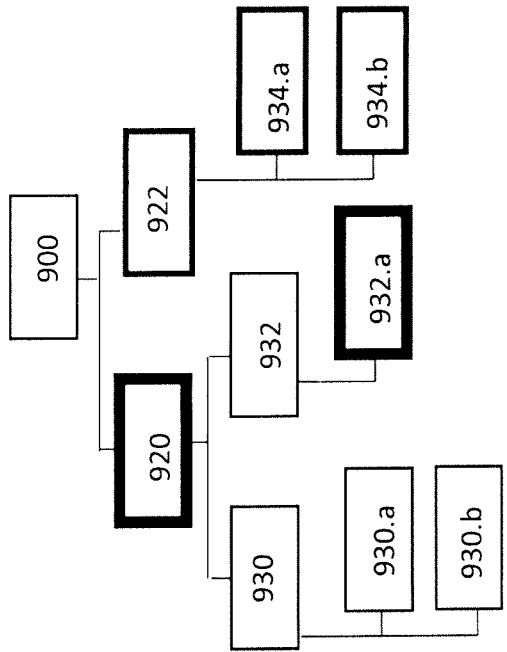
Figure 5D:
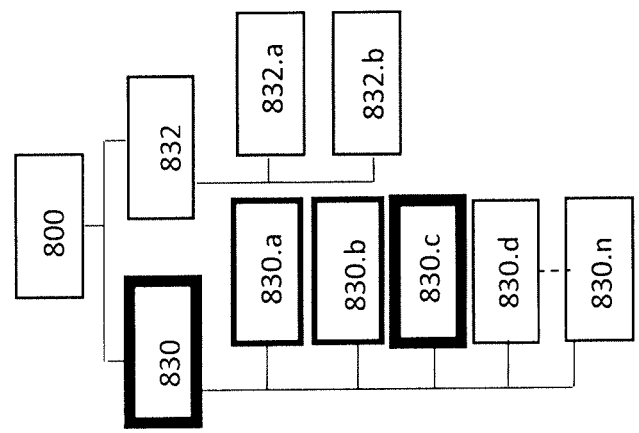

A second pass of the method subsequent to this is illustrated in FIGS. 5*c* and 5*d*. In the second pass of the method, the node 830 and the subnode 932 are selected as the source and destination hierarchy elements, which is illustrated by the extra-bold outlines in FIG. 5*c*. The connections that were automatically configured in the first pass of the method continue to be represented by heavy outlines in FIG. 5*c*.

During determination of the compatible connections, it is established in the exemplary second pass of the method from FIG. 5 that exactly one leaf, which is compatible with the leaf 830.*c*, can be made dependent on the subnode 932, which does not yet contain any leaves. This leaf, labeled 932.*a* in FIG. 5*c*, is generated, and a compatible connection between the leaf 830.*c* and the leaf 932.*a* is configured.

During determination of the compatible connections, it is additionally established that the node 920, which is located in the destination hierarchy structure above the subnode 932 selected as destination hierarchy element, is compatible with the node 830 present in the source sub-hierarchy structure. Even if the node 920 is located outside of the destination sub-hierarchy structure, the compatible connection between the node 830 and the node 920 is created. Consequently, the node 830 is part of two compatible connections, namely part of a first compatible connection between the node 830 and the node 922, and part of a second compatible connection between the node 830 and the node 920.

The compatible connections added in the second pass of the method are illustrated by the extra-bold outlines around the hierarchy elements in question. At the end of the two passes, a set of compatible connections has been configured that is composed of the compatible connections configured in the first pass (heavy outline) and compatible connections configured in the second pass (extra-bold outline). There could also be additional passes. For example, in a third pass the node 830 and the node 930 could be selected, via which compatible connections between the node 830.*d* and the node 930.*a*, and between the node 830.*e* (not shown) and the node 930.*b*, could be produced.

An iterative performance of another exemplary method according to the invention is likewise illustrated in FIG. 6. The first model hierarchy structure from FIG. 6 once again corresponds to the first model hierarchy structure from FIG. 4 (cf. FIG. 6*a* and FIG. 4*a*). The second model hierarchy structure from FIG. 6 corresponds to the second model hierarchy structure from FIG. 3 with the exceptions that the subnode 932 has a leaf 932.*a* and that the node 922 has two leaves 934*a*. and 934.*b* (cf. FIG. 5*a* and FIG. 3*a*). In a first pass of the method, the leaf 832.*a* and the node 920 are selected as source and destination hierarchy elements, as is illustrated by the heavy outline in FIG. 6*a*.

During determination of the compatible connections in the exemplary first pass of the method, it is established that the leaf 832.*a* would be compatible with a leaf 930.*a* to be created, which can be made dependent on the subnode 930 present in the destination sub-hierarchy structure. Consequently the leaf 930.*a* is created, and a compatible connection is created between the leaf 832.*a* and the leaf 930.*a*. In addition, it is established during determination of the compatible connections that the node 832 located above the source hierarchy element is compatible with the node 920, which has been selected as a destination hierarchy element. A suitable compatible connection is also configured automatically. This concludes the first pass of the method. The hierarchy elements of the configured compatible connections are marked with heavy outlines.

Figure 6A:
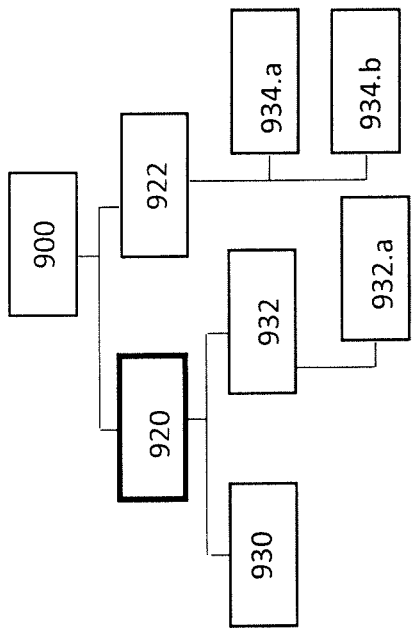
FIGS. 6a to 6d show an exemplary implementation of the method for connecting models of technical systems on the basis of the applicable model hierarchy structures.
Figure 6A:
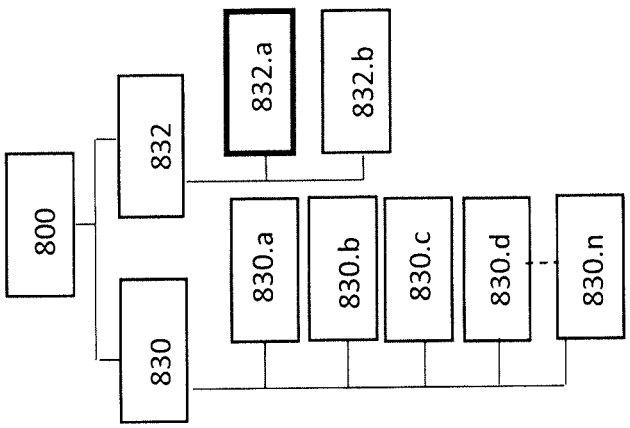
Figure 6B:
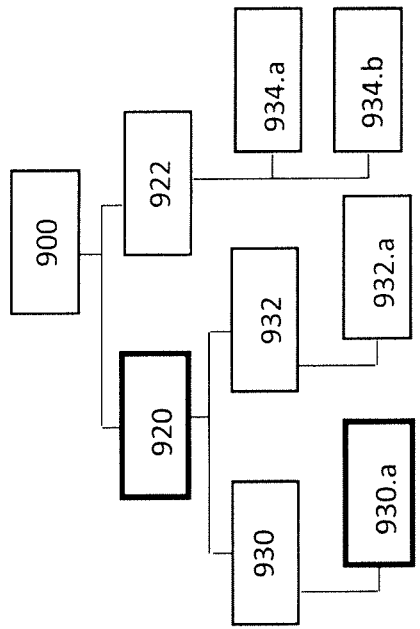
Figure 6B:
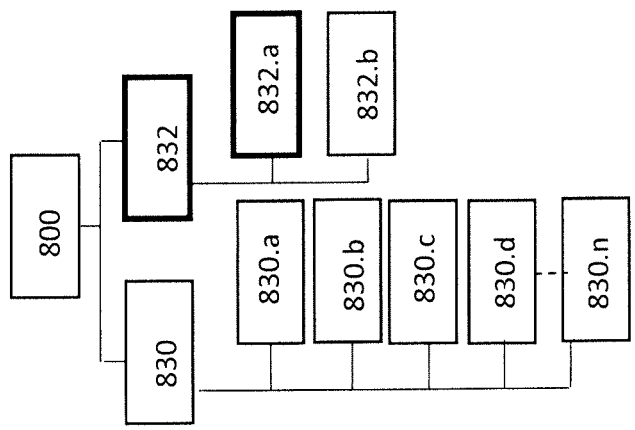
Figure 6C:
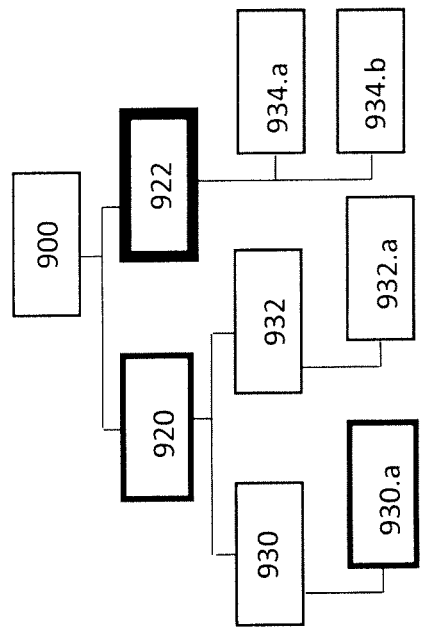
Figure 6C:
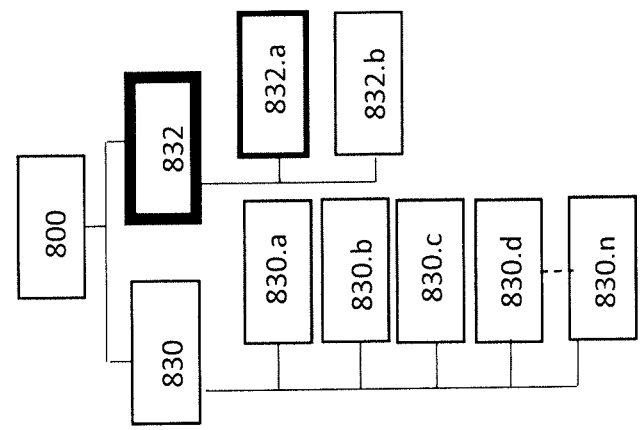
Figure 6D:
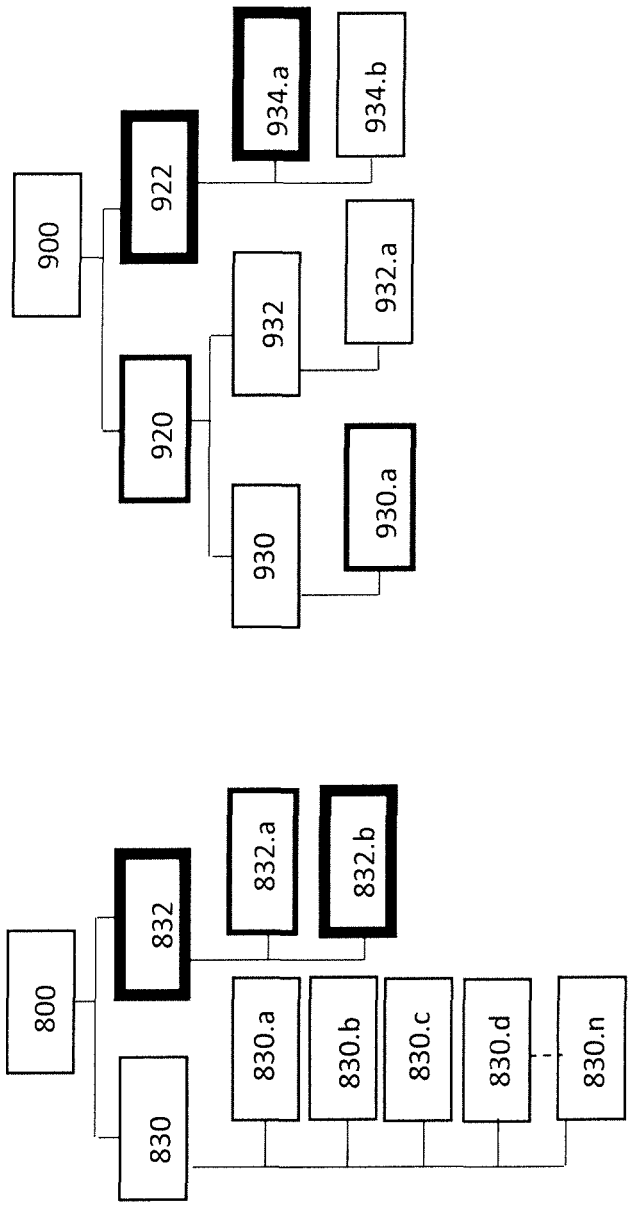

A second exemplary pass of the method is illustrated in FIGS. 6*c* and 6*d*. In the exemplary second pass of the method, the node 832 and the node 922 are selected as source and destination hierarchy elements. Therefore, the source sub-hierarchy structure includes the node 832 and the leaves 832.*a* and 832.*b*. The destination sub-hierarchy structure includes the node 922 and the leaves 934.*a* and 934.*b*. The leaf 832.*a* has already been used for a compatible connection in the first pass, so it is no longer available for the configuration of another compatible connection. However, a compatible connection is possible between the leaf 832.*b* and the leaf 934.*a*, and it is automatically configured by the method. Moreover, a compatible connection is created between the node 832 and the node 922. The new compatible connections are illustrated by extra-bold outlines in FIG. 6*d*.

It would also be possible for the compatible connection between leaf 832.*a* and leaf 930.*a* from the first pass of the method to be released in the second exemplary pass of the method, and for the two leaves 832.*a* and 832.*b* to be connected to the leaves 934.*a* and 934.*b* in the destination sub-hierarchy structure during the second pass of the method.

In the method described, it is also possible for a graphical aid to be provided to the user during the selection of the destination hierarchy element from the destination hierarchy structure. After the selection of the source hierarchy element from the source hierarchy structure it is possible, for example, for the particular hierarchy elements of the destination hierarchy structure in whose sub-hierarchy structures compatible connections could be made to be highlighted in color or otherwise identified. In this way, the user can immediately concentrate on useful hierarchy elements in his selection. It is also possible for the particular hierarchy elements in whose sub-hierarchy structures no compatible connections can be made to be marked, for example by a red "X" or the like. It is also possible for the method to permit or accept only one selection of the destination hierarchy element when at least one compatible connection would be possible in the applicable sub-hierarchy structure.

Figure 2B:
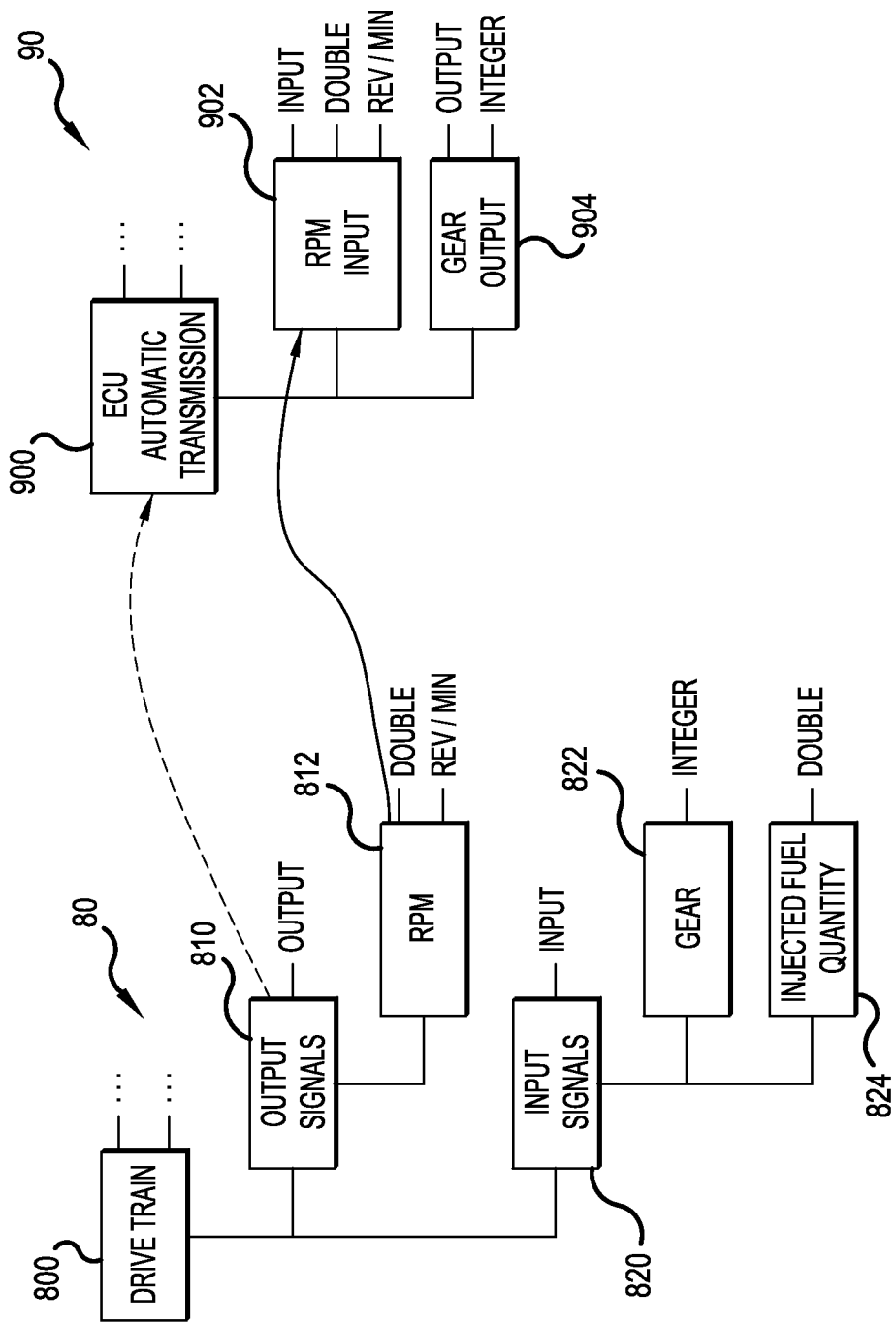
Figure 7:
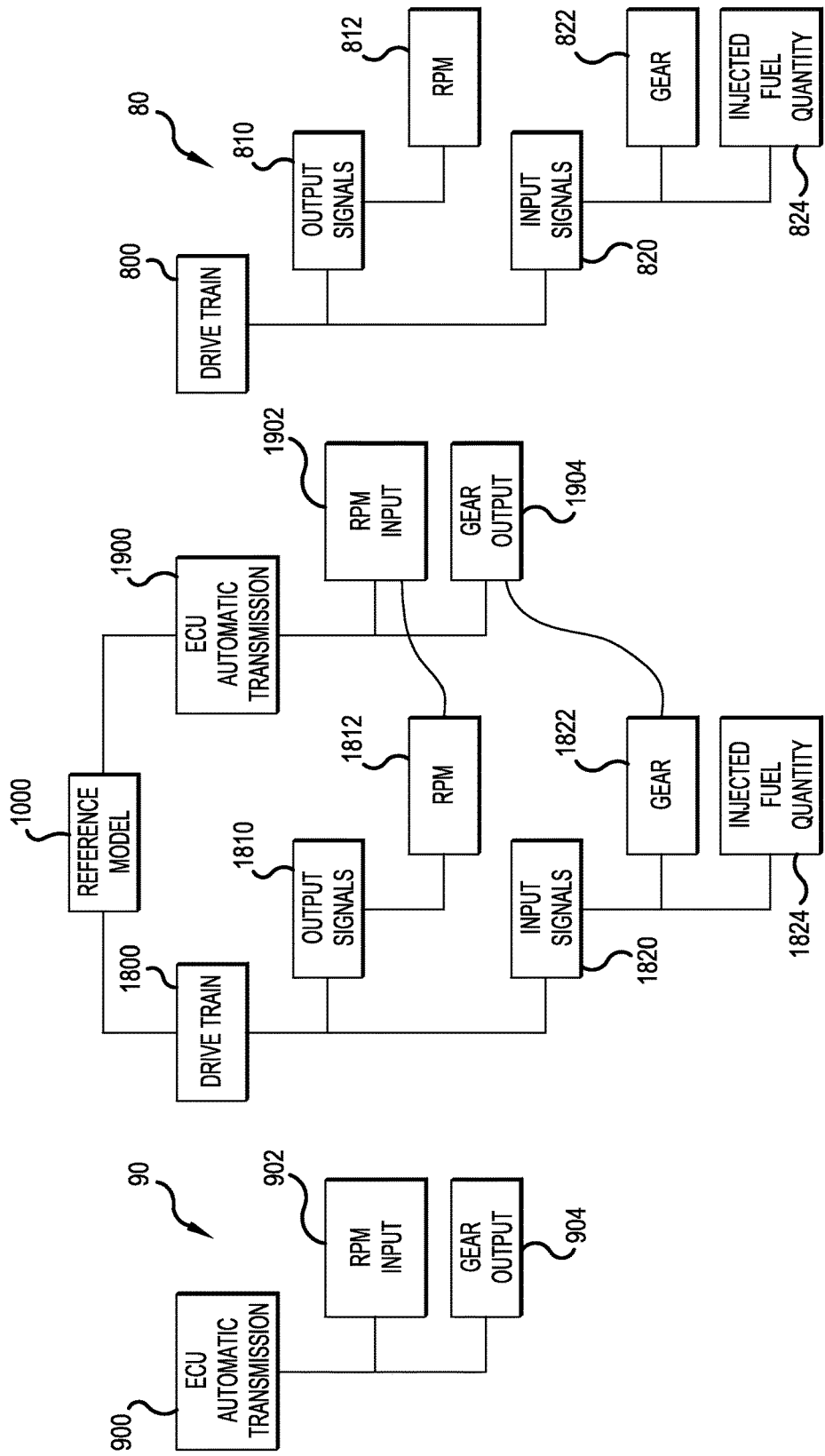
FIG. 7 shows additional exemplary model hierarchy structures for exemplary models in an exemplary testing device.

An alternative method to the method for connecting a first model to a second model described with reference to FIG. 2*b* is described on the basis of FIG. 7. To make comparison easy, the same first and second model hierarchy structures 80 and 90 are shown as in FIG. 2. For reasons of clarity, the attributes of the first and second model hierarchy structures 80 and 90 are not shown in FIG. 7. The attributes correspond to the ones shown in FIG. 2 and described above.

Along with the first model and the second model, a reference model is present in the testing device. The hierarchy structure of the reference model is shown in FIG. 7 in addition to the first model hierarchy structure 80 and the second model hierarchy structure 90. The root node of the hierarchy structure of the reference model is called "reference model", and is labeled with reference number 1000.

In the present example, the reference model is a combination of the first and second models with regard to the data interfaces. In general, it is possible for a reference model to be a collection of all the interfaces of the models available for potential connections. The hierarchy structure of the reference model has a hierarchy structure corresponding to the first hierarchy structure 80 and a hierarchy structure corresponding to the second hierarchy structure 90. The corresponding hierarchy elements are labeled with reference numbers that correspond to the applicable reference number of the hierarchy element of the first and second model hierarchy structures, incremented by 1000. The hierarchy elements corresponding to the root nodes 800 and 900 of the first and second hierarchy structures 80, 90, which is to say the hierarchy elements 1800 and 1900, are dependent on the root node 1000 of the hierarchy structure of the reference model. The hierarchy elements of the reference model available for connection with the other models are also referred to as reference connection elements.

In the reference model, internal connections are present between the reference connection elements. When an internal connection exists between two reference connection elements, this indicates that two models, which both have compatible connections with one of these two reference connection elements, can be compatibly connected to one another. In FIG. 7 two internal connections are indicated by curved lines. The hierarchy element 1812, labeled "RPM", is internally connected to the hierarchy element 1902, labeled "RPM input". The hierarchy element 1822, labeled "gear", is internally connected to the hierarchy element 1904, labeled "gear output".

In the following, the creation of a compatible connection via reference model is described, which corresponds to the creation of the compatible connection from FIG. 2*b*. Once again, the hierarchy element 810 is selected as source hierarchy element. After selection of the source hierarchy element, a check is made as to whether one or more first compatible reference connections exist between the source sub-hierarchy structure defined by the source hierarchy element and the reference model. In the present case, it is determined on the basis of the attributes that a compatible reference connection is possible between the hierarchy element 812 and the reference connection element 1902. As described with respect to FIG. 2b, the root node 900 is selected as destination hierarchy element. After selection of the destination hierarchy element a check is made as to whether one or more second compatible reference connections exist between the destination sub-hierarchy structure defined by the destination hierarchy element and the reference model. In the present case, it is determined on the basis of the attributes that a compatible reference connection is possible between the hierarchy element 902 and the reference connection element 1812, and that a compatible reference connection is possible between the hierarchy element 904 and the reference connection element 1822. Based on the one first compatible reference connection that has been determined, the two second compatible reference connections that have been determined, and the internal connections, which in a sense constitute a connection chain, it is ascertained in the present pass that a compatible connection is possible between the hierarchy element 812 and the hierarchy element 902. This connection is configured. Consequently, the result of the method is analogous to the result of the method described above with respect to FIG. 2b.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for connecting models of technical systems in a testing device equipped for control unit development, having a connection of a first model of a first technical system to a second model of a second technical system, the first model and the second model are either a model of a control unit, a model of a technical system to be controlled, or a model of an environment interacting with the control unit or with the technical system to be controlled, the first model having a first data interface and the second model having a second data interface, the method comprising:
   (a) providing a first model hierarchy structure, which is a representation of at least a part of the first model, the first model hierarchy structure having at least a part of the first data interface, a plurality of hierarchy levels, and is constructed from a first set of hierarchy elements;
   (b) providing a second model hierarchy structure, which is a representation of at least a part of the second model, the second model hierarchy structure having at least a part of the second data interface and a plurality of hierarchy levels, and is constructed from a second set of hierarchy elements;
   (c) allowing a selection of at least one arbitrary source hierarchy element from an arbitrary source hierarchy structure, the arbitrary source hierarchy structure being either the first model hierarchy structure or the second model hierarchy structure, and the other of the first model hierarchy structure and the second model hierarchy structure is defined as a destination hierarchy structure;
   (d) isolating a source sub-hierarchy structure based on selection of the at least one arbitrary source hierarchy element, the source sub-hierarchy structure comprising the at least one arbitrary source hierarchy element and the first or second set of hierarchy elements located below the at least one arbitrary source hierarchy element;
   (e) allowing a selection of at least one destination hierarchy element from the destination hierarchy structure, wherein selection of the at least one destination hierarchy element is not limited to a hierarchy level of the destination hierarchy structure that corresponds to a hierarchy level of the at least one arbitrary source hierarchy element;
   (f) isolating a destination sub-hierarchy structure based on the selection of the at least one destination hierarchy element, the destination sub-hierarchy structure comprising the at least one destination hierarchy element and the first or second set of hierarchy elements located below the at least one destination hierarchy structure;
   (g) determining compatible connections between hierarchy elements of a source sub-hierarchy structure and hierarchy elements of a destination sub-hierarchy structure, or determining compatible connections between hierarchy elements of the first or second set of hierarchy elements of a lowest hierarchy level of the source sub-hierarchy structure and hierarchy elements of the first or second set of hierarchy elements of a lowest hierarchy level of the destination sub-hierarchy structure; and
   (h) automatically configuring at least a part of the compatible connections so that the first model present in the testing device exchanges data through at least the part of the compatible connections with the second model present in the testing device.

2. The method according to claim 1, wherein the first model and the second model are each model of the control unit, or wherein the first model and the second model are each model the technical system to be controlled, or wherein the first model models the control unit and the second model models the technical system to be controlled.

3. The method according to claim 1, wherein all compatible connections are automatically configured.

4. The method according to claim 1, wherein step (h) has an automatic configuration of the compatible connections at a higher level, wherein the automatic configuration connects the hierarchy elements of the source sub-hierarchy structure that are located above the lowest hierarchy level and compatible hierarchy elements of the destination sub-hierarchy structure that are located above the lowest hierarchy level.

5. The method according to claim 4, wherein hierarchy elements that are located outside of the source sub-hierarchy structure above the at least one source hierarchy element or hierarchy elements that are located outside of the at least one destination sub-hierarchy structure above the at least one destination hierarchy element, are additionally taken into account for the automatic configuration of the compatible connections and for the automatic configuration of the compatible connections at the higher level.

6. The method according to claim 1, wherein at least a portion of the hierarchy elements of the first model hierarchy structure and at least a portion of the hierarchy elements of the second model hierarchy structure have attributes, and wherein the determination of compatible connections in step (g) takes place as a function of the compatibility of the attributes.

7. The method according to claim 6, wherein the attributes have model-based attributes including a model type, a signal-based/event-based indication, a controller model/plant model indication, a calculation rate, or a hierarchy element name, or wherein the attributes correspond to the technical system to be controlled, including, a connection type, a signal count, a signal rate, a data flow direction, a connection status, a data type, or a scaling.

8. The method according to claim 1, wherein at least the steps (c) to (h) are executed in multiple passes, and wherein configured compatible connections from an earlier pass are no longer available for a later pass.

9. The method according to claim 1, wherein at least the steps (c) to (h) are executed in multiple passes, wherein depending on the selection of the at least one arbitrary source hierarchy element and on the at least one destination hierarchy element, step (h) has at least one occurrence of the following steps:
deletion of at least one old, compatible connection configured in an earlier execution of step (h) or configuration of at least one new compatible connection, and wherein at least one hierarchy element of the old, compatible connection is used for the at least one new compatible connection.

10. The method according to claim 1, wherein a connection is provided from the first model and the second model to at least one additional model of another technical system, wherein the at least one additional model is a model of a control unit, a model of a technical system to be controlled, or a model of an environment interacting with the control unit or with the technical system to be controlled, and wherein the method is carried out for all paired combinations of the first model, the second model, and the at least one additional model.

11. A method for connecting models of technical systems in a testing device equipped for control unit development, having a connection of a first model of a first technical system to a second model of a second technical system, the first model and the second model each include a model of a control unit, a model of a technical system to be controlled, or a model of an environment interacting with the control unit or with the technical system to be controlled, and the first model has a first data interface and the second model has a second data interface, the method being performed with the use of a reference model that has a reference data interface, the reference data interface having a plurality of reference connection elements, and the reference model having a plurality of internal connections between the reference connection elements, the method comprising:

(a) providing a first model hierarchy structure, which is a representation of at least a part of the first model, and has a representation of at least a part of the first data interface, has a plurality of hierarchy levels, and is constructed from a first set of hierarchy elements;

(b) providing of a second model hierarchy structure, which is a representation of at least a part of the second model, and has a representation of at least a part of the second data interface, has a plurality of hierarchy levels, and is constructed from a second set of hierarchy elements;

(c) allowing a selection of at least one arbitrary source hierarchy element from an arbitrary source hierarchy structure, wherein the arbitrary source hierarchy structure is either the first model hierarchy structure or the second model hierarchy structure, and the other of the first model hierarchy structure and the second model hierarchy structure is defined as a destination hierarchy structure;

(d) isolating a source sub-hierarchy structure based on the selection of the at least one arbitrary source hierarchy element, wherein the source sub-hierarchy structure comprises the at least one arbitrary source hierarchy element and hierarchy elements of the first or second set of hierarchy elements located below the at least one arbitrary source hierarchy element;

(e) determining first compatible reference connections between hierarchy elements of the first and second set of hierarchy elements of a source sub-hierarchy structure and reference connection elements, or determining first compatible reference connections between the hierarchy elements of the first or second set of hierarchy elements of a lowest hierarchy level of a source sub-hierarchy structure and reference connection elements;

(f) allowing a selection of at least one destination hierarchy element from the destination hierarchy structure, wherein the selection of the at least one destination hierarchy element is not limited to a hierarchy level of the destination hierarchy structure that corresponds to a hierarchy level of the at least one arbitrary source hierarchy element;

(g) isolating a destination sub-hierarchy structure based on the selection of the at least one destination hierarchy element, wherein the destination sub-hierarchy structure comprises the at least one destination hierarchy element and hierarchy elements of the first or second set of hierarchy elements located below the at least one destination hierarchy element;

(h) determining second compatible reference connections between hierarchy elements of the first or second set of hierarchy elements of a destination sub-hierarchy structure and reference connection elements, or determining second compatible reference connections between hierarchy elements of the first or second set of hierarchy elements of a lowest hierarchy level of a destination sub-hierarchy structure and reference connection elements;

(i) determining compatible connections between hierarchy elements of the source sub-hierarchy structure and hierarchy elements of the destination sub-hierarchy structure, or determining compatible connections between hierarchy elements of a lowest hierarchy level of the source sub-hierarchy structure and the hierarchy elements of the lowest hierarchy level of the destination sub-hierarchy structure based on the first compatible reference connections, internal connections of the reference model, and the second compatible reference connections; and (j) automatically configuring at least a part of the compatible connections so that the first model present in the testing device exchanges data with the second model present in the testing device through at least the part of the compatible connections.

12. The method according to claim 1, the method comprising:
performing a simulation in which the first model present in the testing device communicates with the second model present in the testing device through the compatible connections that were automatically configured in step (h),
wherein at least one of the first model and the second model communicates through an input/output interface of the testing device with the control unit to be tested that is connected to the testing device or with the technical system to be controlled that is connected to the testing device.

13. A computer program product and computer program disposed on a non-transitory computer readable medium for carrying out a method for connecting models of technical systems in a testing device equipped for control unit development that is designed such that a method according to claim 1 is carried out.

14. The method according to claim 1, the testing device having the first model of the first technical system and a second model of a second technical system, the testing device being adapted to perform steps (a)-(h) of the method for connecting the first model and the second model, and the testing device having an input/output interface for connecting the control unit to be tested or the technical system to be controlled, wherein the input/output interface allows communication of at least one of the first model and the second model with the control unit to be tested or with the technical system to be controlled.

15. A combination of the testing device for control unit development and an external computing device, a computer, tablet, or mobile telephone connected therewith, wherein the external computing device is adapted to perform the method for connecting the first model and the second model according to claim 1, and wherein the testing device has an input/output interface for connecting the control unit to be tested or the technical system to be controlled, wherein the input/output interface allows communication of at least one of the first model and the second model with the control unit to be tested or with the technical system to be controlled.

* * * * *